US009838213B2

United States Patent
Hyslop et al.

(10) Patent No.: US 9,838,213 B2
(45) Date of Patent: Dec. 5, 2017

(54) PARAMETERIZED QUALITY OF SERVICE ARCHITECTURE IN A NETWORK

(75) Inventors: Bradley Thomas Hyslop, La Jolla, CA (US); Abul Qasem Shamsuddin Safdar, San Diego, CA (US); Robert L. Hare, Jr., San Diego, CA (US); Zong Liang Wu, San Diego, CA (US); Inderjit Singh, Ocean Beach, CA (US); Shlomo Ovadia, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 0 days.

(21) Appl. No.: 12/027,202

(22) Filed: Feb. 6, 2008

(65) Prior Publication Data

US 2008/0192752 A1 Aug. 14, 2008

Related U.S. Application Data

(60) Provisional application No. 60/900,206, filed on Feb. 6, 2007, provisional application No. 60/901,564, filed
(Continued)

(51) Int. Cl.
*H04L 12/26* (2006.01)
*H04L 12/403* (2006.01)
(Continued)

(52) U.S. Cl.
CPC .......... *H04L 12/403* (2013.01); *H04W 74/06* (2013.01); *H04L 12/2801* (2013.01)

(58) Field of Classification Search
USPC .... 370/229, 230, 230.1, 231, 232, 235, 236, 370/238, 252, 346
See application file for complete search history.

(56) References Cited

U.S. PATENT DOCUMENTS 6,252,755 B1 * 6/2001 Willer ............... H04B 3/56
361/113
6,272,127 B1 * 8/2001 Golden et al. ............ 370/352
(Continued)

FOREIGN PATENT DOCUMENTS

CN 1356012 A 6/2002
CN 1520659A A1 8/2004
(Continued)

OTHER PUBLICATIONS

International Search Report and Written Opinion dated Dec. 8, 2008 from International Application No. PCT/US2008/053202.
(Continued)

*Primary Examiner* — Kwang B Yao
*Assistant Examiner* — Nguyen Ngo
(74) *Attorney, Agent, or Firm* — McAndrews, Held & Malloy, Ltd.

(57) ABSTRACT

A communication system and method including the steps of receiving a first request to initiate a guaranteed quality of service flow in a network, broadcasting a second request from a Network Coordinator to a plurality of nodes connected to the network and receiving a first response to the second request from at least one ingress node. The method further includes receiving a second response to the second request from at least one egress node indicating whether the at least one egress node has available resources to receive the guaranteed quality of service flow and allocating resources for the guaranteed quality of service flow if the at least one ingress node has available resources to transmit, and the at least one egress node has available resources to receive, the guaranteed quality of service flow.

24 Claims, 11 Drawing Sheets

Related U.S. Application Data on Feb. 14, 2007, provisional application No. 60/927,613, filed on May 4, 2007, provisional application No. 60/901,563, filed on Feb. 14, 2007, provisional application No. 60/927,766, filed on May 4, 2007, provisional application No. 60/927,636, filed on May 4, 2007, provisional application No. 60/931,314, filed on May 21, 2007.

(51) Int. Cl.
*H04W 74/06* (2009.01)
*H04L 12/28* (2006.01)

(56) References Cited

U.S. PATENT DOCUMENTS

| | | | |
|---|---|---|---|
| 6,510,219 B1* | 1/2003 | Wellard | H04L 41/5025 370/354 |
| 6,658,517 B1 | 12/2003 | Niimi et al. | |
| 6,717,913 B1 | 4/2004 | Ghahremani et al. | |
| 6,888,831 B1 | 5/2005 | Hospodor | |
| 7,002,917 B1* | 2/2006 | Saleh | 370/238 |
| 7,327,757 B2* | 2/2008 | Ghahremani et al. | 370/466 |
| 7,756,958 B2 | 7/2010 | Nagarajrao et al. | |
| 7,904,578 B1* | 3/2011 | Anschutz | H04L 12/2898 379/399.01 |
| 2002/0029271 A1 | 3/2002 | Schwager | |
| 2002/0044553 A1 | 4/2002 | Chakravorty | |
| 2002/0080816 A1 | 6/2002 | Spinar et al. | |
| 2002/0159411 A1 | 10/2002 | Airy et al. | |
| 2003/0005130 A1* | 1/2003 | Cheng | H04L 12/2805 709/228 |
| 2003/0035442 A1 | 2/2003 | Eng | |
| 2003/0067929 A1 | 4/2003 | Matsuzawa | |
| 2003/0072264 A1 | 4/2003 | Mo et al. | |
| 2003/0095562 A1 | 5/2003 | Liu et al. | |
| 2005/0036466 A1* | 2/2005 | Malik et al. | 370/338 |
| 2005/0047335 A1 | 3/2005 | Cheng et al. | |
| 2005/0111462 A1 | 5/2005 | Walton et al. | |
| 2005/0152370 A1 | 7/2005 | Meehan et al. | |
| 2005/0254503 A1 | 11/2005 | Claseman | |
| 2005/0265258 A1* | 12/2005 | Kodialam et al. | 370/254 |
| 2005/0276219 A1 | 12/2005 | Wang et al. | |
| 2006/0156169 A1 | 7/2006 | Shen et al. | |
| 2006/0280197 A1 | 12/2006 | Stone | |
| 2007/0002821 A1* | 1/2007 | Carlson et al. | 370/349 |
| 2007/0022469 A1* | 1/2007 | Cooper | H04K 1/00 726/3 |
| 2007/0058646 A1 | 3/2007 | Hermoni | |
| 2007/0130246 A1 | 6/2007 | Lau et al. | |
| 2007/0168486 A1 | 7/2007 | McCoy et al. | |
| 2007/0223669 A1* | 9/2007 | Bowers | H04M 1/723 379/201.01 |
| 2008/0130661 A1* | 6/2008 | Jiang et al. | 370/401 |
| 2008/0137684 A1* | 6/2008 | Huang et al. | 370/447 |
| 2009/0135729 A1* | 5/2009 | Saffre | 370/252 |
| 2009/0190549 A1 | 7/2009 | Kim et al. | |
| 2009/0296668 A1 | 12/2009 | Capone et al. | |
| 2010/0002584 A1 | 1/2010 | Jalali | |

FOREIGN PATENT DOCUMENTS

| | | |
|---|---|---|
| EP | 0971509 A1 | 1/2000 |
| EP | 1 225 785 A1 | 7/2002 |
| EP | 1601144 A | 2/2005 |
| GB | 2406481 A | 3/2005 |
| JP | 2002359662 A | 12/2002 |
| JP | 2003204333 A | 7/2003 |
| JP | 2005065240 A | 3/2005 |
| JP | 2005-533414 | 4/2005 |
| JP | 2006-100952 A2 | 4/2006 |
| JP | 2007-019604 A2 | 1/2007 |
| WO | 00/72626 A1 | 11/2000 |
| WO | WO 00/72626 A | 11/2000 |
| WO | WO 01/82550 A | 11/2001 |
| WO | WO03/003658 A1 | 1/2003 |
| WO | 2004/006615 A1 | 1/2004 |
| WO | 2005076544 A1 | 8/2005 |
| WO | 2006028138 A1 | 3/2006 |

OTHER PUBLICATIONS

IEEE revision with Corrections, Clarifications & Enhancements. P802.11-REVma/D9.0 Oct. 2006, pp. 319-320.
International Search Report dated Mar. 2, 2009 from International Application No. PCT/US2008/054006.
Hwang, Won-Joo et al. "HomeMAC: QoS-based MAC Protocol for the Home Network", Proceedings of the Seventh International Symposium on Computers and Communications (ISCC '02).
PCT/US2008/053222 International Search Report (Filed Jun. 2, 2008). EP Search Authority.
PCT/US2008/053212 International Search Report (Filed Jun. 2, 2008). EP Search Authority.
EP Communication issued Jul. 5, 2011 in counterpart EP Application No. 08729205.8.
Communication "First Office Action" dated Jun. 23, 2011 in counterpart CN Application No. 200880007820.6.
Selvakumar S et al: "Differential priority-based adaptive rate service discipline for QoS guarantee of video stream", Computer Communications, Elsevier Science B.V., Nov. 25, 1997, pp. 1160-1174, vol. 20, No. 13, City/Country Unknown.
European Search Report for EP Appln. No. 12152215.5, dated Apr. 19, 2012.
Yavatkar, R. et al., "SBM (Subnet Bandwidth Manager: A Protocol for RSVP-based Admission Control over IEEE 802-style networks; rfc2814.txt", May 2000, pp. 7-9, 31-33, XP015008597, ISSN: 0000-0003.
Seaman, M., et al., "Integrated Service Mappings on IEEE 802 Networks; draft-ietf-issll-is802-svc-mapping-02.txt", Aug. 1998, vol. issll, No. 2, XP015021742, ISSN: 0000-0004.
Ando, et al., QoS Technology for Home Networks, Consumer Communications and Networking Conference, Jan. 5-8, 2004, pp. 19-24.
European Search Report, Application No. 12152218.9-1249/2458801, pp. 1-6.
IEEE "Layer management", Revision with Corrections, Clarifications & Enhancements, P802.11-REVma/D9.0 Oct. 2006, pp. 319-320.
European Search Report for European Patent Application No. 12152213.0 dated May 16, 2012.
Chinese Office Action dated Nov. 25, 2011 from related application No. 200880004836.1.
European Rule 71 Communication dated Nov. 10, 2016 for European Patent Application No. 08729205.8.

\* cited by examiner

PARAMETERIZED QUALITY OF SERVICE ARCHITECTURE IN A NETWORK

CLAIM OF PRIORITY

This application claims priority to U.S. Provisional Application 60/900,206 filed Feb. 6, 2007, U.S. Provisional Application 60/901,564 filed Feb. 14, 2007, U.S. Provisional Application 60/927,613 filed May 4, 2007, U.S. Provisional Application 60/901,563 filed Feb. 14, 2007, U.S. Provisional Application 60/927,766 filed May 4, 2007, U.S. Provisional Application 60/927,636 filed May 4, 2007, and U.S. Provisional Application 60/931,314 filed May 21, 2007, each of which is herein incorporated by reference.

FIELD OF THE DISCLOSURE

The disclosed method and apparatus relate to a communication protocol in a network, and more specifically, relate to a quality of service protocol in a network.

BACKGROUND

In addition to computers, home networks now typically include multiple types of subscriber equipment configured to deliver subscriber services through the home network. The subscriber services include the delivering of multimedia, such as streaming audio and video, through the home network to the subscriber equipment where it is presented to a user. As the number of available subscriber services increases, so does the number of devices being connected to a home network. The increase in the number of services and devices increases the complexity of the coordination between the network nodes as each node may be produced by a different manufacturer at different times. Some home-networking technologies have emerged in an attempt to facilitate simple home-network solutions and take advantage of existing network infrastructure that may be present in a number of homes. For example, the Home Phone Network Alliance (HPNA) allows users to network home computers by using the existing telephone and coaxial cable wiring within a home. HPNA-enabled devices utilize a different frequency spectrum than the spectrum used by faxes and phones. Instead of using existing telephone and coaxial cable wiring, the Homeplug® Power Alliance utilizes the existing electrical power wiring in a home to create a home network. On issue with Homeplug® is that the network bandwidth is susceptible to significant reductions due to large variations of the home electrical wiring and reactive loads in the outlets.

Additionally, problems with these technologies arise in implementing network devices that correctly interact with other network devices. These problems may inhibit the deployment of newer devices that provide later-developed services in the presence of older (legacy) devices. The emerging Multimedia over Coax Alliance (MOCA) standard architecture impacts this problem in that (1) network behaviors dynamically assign a device the "Network Coordinator" (NC) role in order to optimize performance, (2) only the device in the NC role is known to be able to schedule traffic for all other nodes in the network, and (3) form a full mesh network architecture between any device and its peers.

With many potential applications sharing the same digital network, various applications have to compete for the same limited bandwidth compounding the distribution problem. A bandwidth-intensive application, such as a high-throughput download, may cause the degradation of other more important applications sharing the network. This outcome may be unacceptable when the other application requires a high quality of service.

Various solutions to solve this problem have been proposed, usually involving a high-level network controller or having high-level applications setting priority to data packets or data streams within the network. Moreover, intelligent network devices require high computational power and are consequently more expensive than they need to be. Finally, complex network devices are impractical for home use, as most consumers do not have the sophistication or experience to configure a computer network.

SUMMARY OF THE DISCLOSURE

In one embodiment, a communication method includes the steps of: (1) receiving a first request to initiate a guaranteed quality of service data flow in a network, (2) broadcasting a second request from an NC to a plurality of nodes connected to the network, and (3) receiving a first response to the second request from at least one ingress node. The second request is based on the first request, and the first response indicates whether at least one ingress node has available resources to transmit the guaranteed quality of service flow. The method further includes receiving a second response to the second request from at least one egress node and allocating resources for the guaranteed quality of service flow if the ingress node(s) have available resources to transmit, and the egress node(s) have available resources to receive, the guaranteed quality of service flow.

In another embodiment, a system includes a physical interface connected to a coordinated network and a quality of service module coupled to the physical interface. The physical interface is configured to transmit and receive messages through the coordinated network. The quality of service module configured is to admit one or more guaranteed quality of service flows in the coordinated network through a plurality of Layer 2 messages.

OVERVIEW

Figure 1:
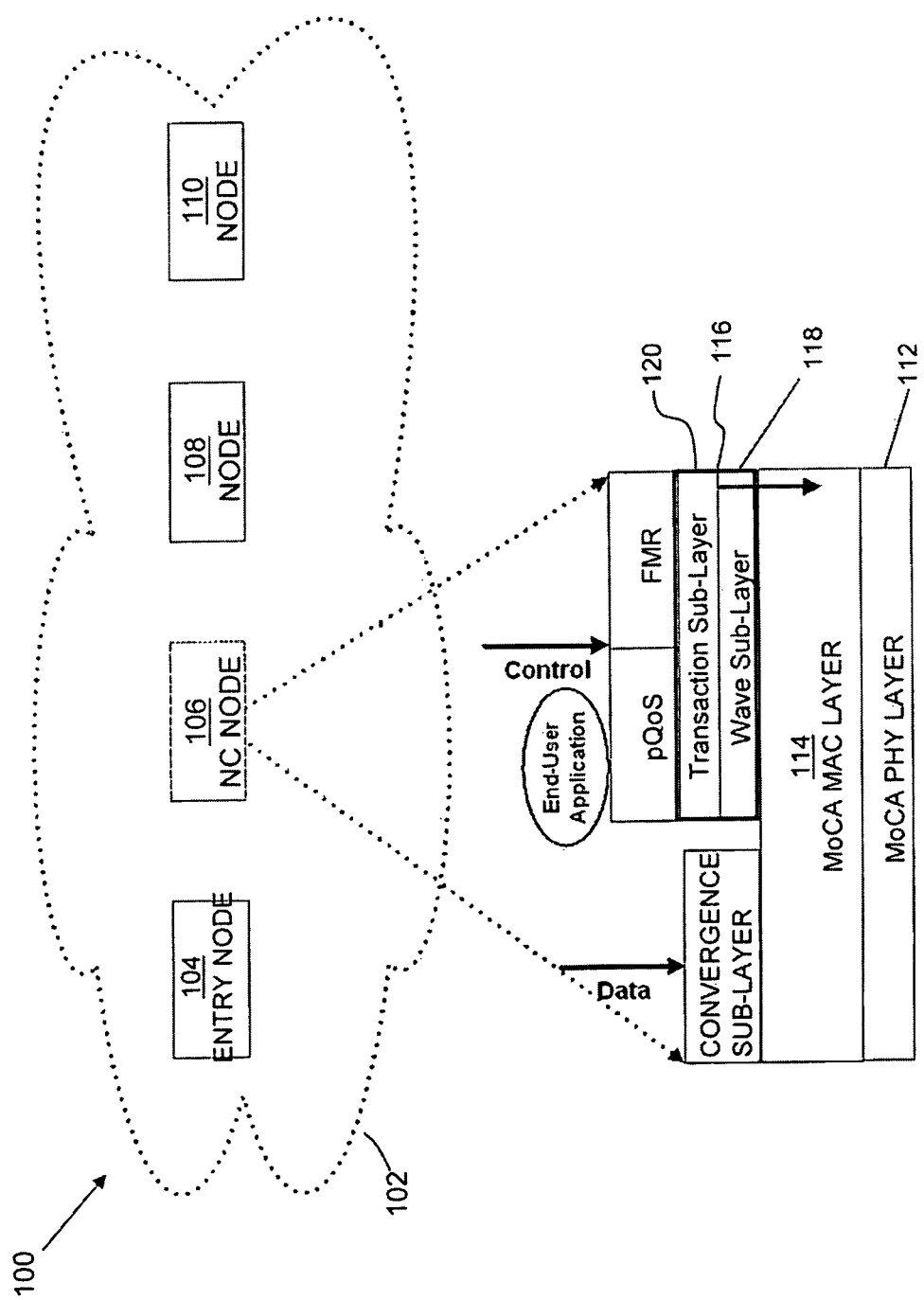
FIG. 1 illustrates an embodiment of a network architecture.

One system as disclosed herein and shown in FIG. 5 and described in more detail below, includes a physical interface 512 such as a Multimedia over Coax Alliance (MoCA) PHY Layer, connected to a coordinated network 502, such as a MoCA 1.1 Network. The physical interface 512 is configured to transmit and receive messages through the coordinated network 502. The system also includes a quality of service (QoS) manager 520 connected to a Layer 2 Management Entity (L2ME) 516. The QoS manager 520 is configured to admit one or more guaranteed quality of service data flows, e.g., a unidirectional traffic stream from a single ingress node (source device) to one or more egress nodes (sink device) in the coordinated network 502 through a plurality of Layer 2 messages managed by the L2ME 516.

One network architecture as disclosed herein supports parameterized quality of service (pQoS) in a managed network. In a pQoS-enabled network, the data flows in a network may include guaranteed (parameterized) and/or best effort data flows. The guaranteed (parameterized) flows are ensured at least one level of performance defined by predetermined parameters of the flow established during an admission (setup) process discussed in detail below. A time slot reserved for a parameterized flow may be made available to other flows if the parameterized flow does not have data to transmit during its timeslot. In the disclosed architecture shown in FIG. 6 and described in more detail below, a node 604, such as a c.Link Data Link Layer, transmits a QoS initiation request to a Network Coordinator (NC) node 606 to initiate a guaranteed quality of service flow having at least one parameter of quality. A Layer 2 request including at least one parameter from the QoS initiation request is broadcast by the NC 606 to all nodes 604, 608. A plurality of nodes 608, including an ingress node 508 and an egress node 510, transmit a response to the broadcast request that indicates if the ingress node 508 has available resources to transmit, and the egress node 510 has the resources to receive, the flow. If the received responses indicate that the that ingress and egress nodes 508, 510 each have the resources to set up the flow, then the NC node 606 broadcasts a message to the plurality of nodes 608 indicating that the nodes 608 should commit the resources to the flow.

DETAILED DESCRIPTION

This description of the embodiments is intended to be read in connection with the accompanying drawings, which are to be considered part of the entire written description.

The embodiments relate in general to an apparatus, system, method, and architecture to support a low-level messaging framework in a network. Some embodiments facilitate Layer 2 messaging to enable low-cost and high-speed management of resources within the network in order to secure the capability to distribute multimedia data (such as video/audio, games, images, generic data, and interactive services) within existing in-home networks.

The embodiments facilitate making home networking devices simple so that they are easy to use and are cost-effective. In other words, home networks should be simple to configure so home users do not have to deal with complex configuration menus or require advanced knowledge of computer networks. The embodiments also resolve configuration and cost issues through the implementation of a low-level digital transport framework that does not require high amounts of computing power. This low-level framework may be thought of as an extension to the Media Access Control (MAC) sub-layer or the physical (PHY) network layer and is referred to as a "Layer 2 messaging framework."

Layer 2 messaging may be implemented in a variety of networks where a spectrum is shared and negotiated due to the introduction or removal of nodes as well as the evolution of network signaling capacity. In some embodiments, the network is a coordinated network having a Network Coordinator (NC) that coordinates the communication between the several devices connected to the network. Coordination is achieved by the NC allocating time-slots to network devices during which the devices may transmit or receive MAC messages, probes, and data. The network devices connected to the coordinated network may include managed and unmanaged devices. Examples of such networks include coaxial networks in accordance with the Multimedia over Coax Alliance (MoCA) standard, wired networks on "twisted-pair" wire, or wireless home networks. Embodiments are herein described as being implemented with eight or 16 nodes within the network. However, other embodiments may incorporate extensions to enable any number of nodes within a variety of networks. Additionally, embodiments may include systems, methods and devices that include Layer 2 messaging architecture and protocols to support end-user applications and vendor-specific services.

Embodiments will now be described with reference to a Layer 2 Management Entity (L2ME) architecture and messaging protocol for a digital network. Some embodiments support application layer-triggered transactions, such as but not limited to, a Universal Plug and Play (UPnP) Quality of Service and IEEE Stream Reservation Protocol (SRP). Layer 2 messaging protocols may enable capabilities such as parameterized Quality of Service (pQoS) transactions within the network. Note that the interfaces between the L2ME and an application layer may vary.

FIG. 1 illustrates a coordinated mesh network architecture 100 with multiple network nodes 104, 106, 108, 110 connected to a network 102. Network node 106 is the NC node and is shown to be configured with PHY layer 112, MAC sub-layer 114, and an L2ME 116. Note that any network node may have multiple physical interfaces and may implement upper-layer functionality (e.g., TCP/IP, UDP, or the like). Network node 104 is an Entry node (EN). Each of nodes 104, 108, and 110 may also be configured with an L2ME 116.

L2ME 116 provides Layer 2 interfaces and management services through which Layer 2 management functions can be invoked. Based on end-user application initiated transactions, L2ME 116 is responsible for executing and managing all L2ME transactions, such as parameterized Quality of Service, between network nodes 104, 106, 108, and 1 10. L2ME 116 includes two sub-layers: an upper Transaction Protocol sub-layer 120 and a lower Wave Protocol sub-layer 118. The L2ME Wave Protocol sub-layer 118 is a high-reliability message mechanism in L2ME 116 configured with its own messaging protocol. The L2ME Wave Protocol enables a network node to participate in robust, network-wide, low-latency generic transactions and enables NC node 106 to manage the flow of low-cost audio/video bridging devices, such as devices in accordance with the IEEE 802.1Qat/D0.8 draft standard (July, 2007), across a home network with multiple Layer 2 Quality of Service segments.

L2ME Wave Protocol

The L2ME Wave Protocol provides reliable transport service for L2ME Transaction Protocol by generating multiple Wave Cycles. An L2ME Wave includes one or more L2ME Wave Cycles. A Wave Cycle includes transmission of a message from the NC to one or more nodes and receipt of a corresponding response to the message from the one or more nodes. A Wave Cycle starts when NC node 106 broadcasts a particular payload, such as a Request, to all nodes 104, 108, 110 connected to the network 102. In one embodiment, the NC node 106 first classifies all the nodes in the WAVE_NODEMASK field, described in greater detail below, into three categories before initiating the Wave Cycle. The first category of nodes ("Category 1 nodes") includes network nodes that have yet to be specified in the CYCLE_NODEMASK field of a Request L2ME Frame issued by the NC node 106. The second category of nodes ("Category 2 nodes") includes network nodes that have been identified in the CYCLE_NODEMASK field in a Request L2ME Frame issued by NC node 106, but from which NC node 106 has yet to receive a Response. The third category of network nodes ("Category 3 nodes") includes the network nodes from which NC node 106 has received a Response L2ME Frame.

After NC node 106 has appropriately categorized each of the network nodes 104, 108, 110 as Category 1, 2, or 3 nodes, NC node 106 constructs the CYCLE_NODEMASK in accordance with the following guidelines. First, if there are three or more Category 1 nodes, then NC node 106 sets a corresponding number of bits to "1" in the CYCLE_NODEMASK. If there are three or more Category 1 nodes, the number of bits set by NC node 106 in the CYCLE_NODEMASK may be less than the total number of Category 1 nodes, but not less than three bits. For example, if there are five Category 1 nodes, NC node 106 may set three, four, or five bits to "1" in the CYCLE_NODEMASK. Second, if there are three or more Category 2 nodes, NC node 106 sets three or more of the bits in the CYCLE_NODEMASK to "1", which correspond to the Category 2 nodes. Third, if there are no Category 1 nodes, or if all of the bits corresponding to Category 1 nodes have already been set to "1" in the CYCLE_NODEMASK, then NC node 106 sets the bits corresponding to Category 2 nodes in the CYCLE_NODEMASK to "1". Finally, NC node 106 may set as many bits to "1" in the CYCLE_NODEMASK as NC node 106 may receive a Response from without disrupting network services. Once the CYCLE_NODEMASK has been generated, NC node 106 initiates the Wave Cycle by broadcasting an L2ME message that includes the CYCLE_NODEMASK.

A Wave Cycle is completed when either NC node 106 receives a corresponding payload, such as a Response, from some or all of the nodes 104, 108, 110, or the NC node's timer expires. For example, NC node 106 transmits a message and then starts its timer. If the timer of NC node 106 reaches T21 (e.g., 20 milliseconds) before receiving a responsive message from some or all of the network nodes identified in the CYCLE_NODEMASK, then the Wave Cycle is completed even though NC node 106 has not received a responsive message. Note that T21 is the maximum allowable time interval between the transmission of a Request L2ME Frame by NC node 106 and the transmission of a corresponding Response L2ME Frame by the requested node. An L2ME Wave Cycle is successfully completed when each of the nodes identified in the WAVE_NODEMASK field of the payload have responded. Put another way, a Wave Cycle is successful if all of the network nodes 104, 108, 110 are classified as Category 3 nodes before the timer of NC node 106 reaches T21. Alternatively, a Wave Cycle is unsuccessful, or fails, if NC node 106 does not receive a Response L2ME Frame from a Category 2 node that had its corresponding bit set to "1" in the CYCLE_NODEMASK transmitted by NC node 106. If the Wave Cycle fails, then NC node 106 repeats the Wave Cycle by sending a multicast message to only those nodes from which NC node 106 did not receive a Response L2ME Frame. Note that in one embodiment, multicast messages are treated the same as broadcast messages with respect to repeating the Wave Cycle by sending a multicast message to the nodes that do not respond. NC node 106 will complete the scheduled Wave Cycles before creating a new Wave Cycle for any node from which a Response was not received.

Figure 2:
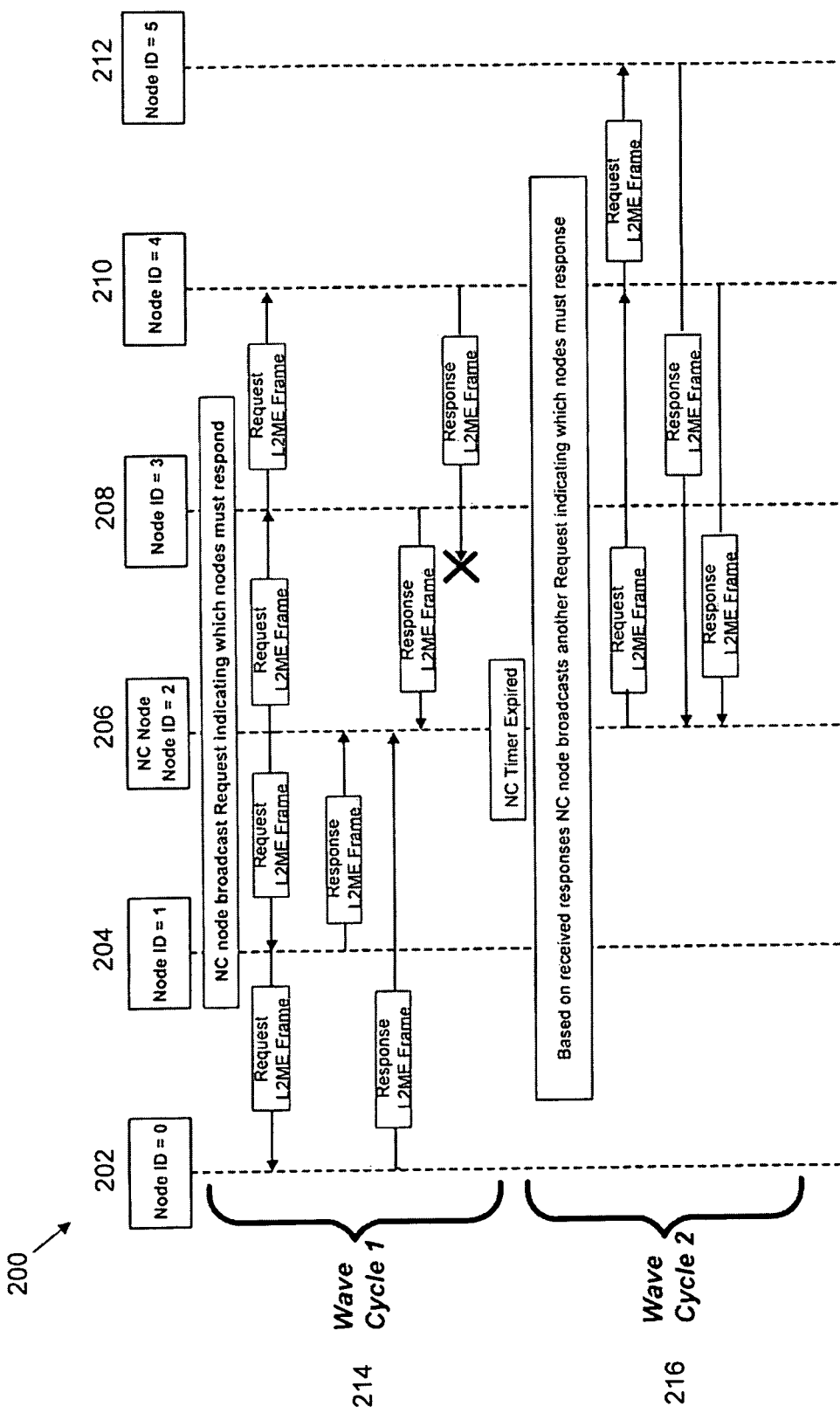
FIG. 2 is a diagram showing two L2ME Wave Cycles in accordance with the embodiment of FIG. 1.

FIG. 2 is an example of an L2ME wave diagram 200 showing two Wave Cycles 214, 216. A first Wave Cycle 214 is initiated when NC node 206, with node ID=2, broadcasts a message having a payload to all nodes 202, 204, 208, 210, 212 connected to the network 102. In this example, the payload includes the NODE_BITMASK 011011, where the right-most bit corresponds to the node with node ID=0. This bitmask indicates that NC node 206 expects to receive a payload containing a WAVE_ACK from nodes 202, 204, 208, and 210. As shown in FIG. 2, NC node 206 only receives a Response L2ME Frame from nodes 202, 204, and 208, and the Response L2ME Frame from node 210 is either lost or not received before the NC node 206 timer expires. The expiration of the timer in NC node 206 completes the first Wave Cycle 214, but does not finish the transaction.

Since NC node 206 has not received a Response L2ME Frame from node 210, NC node 206 sends another Request L2ME Frame to node 210, thereby initiating a second Wave Cycle 216. The Request sent to node 210 is also sent to node 212 and includes the NODE_BITMASK 110000 requesting nodes 210 and 212 to send a WAVE_ACK to NC node 206. The Response L2ME Frames from nodes 210 and 212 are subsequently received by the NC node 206, thereby completing Wave Cycle 216.

L2ME Transaction Protocol

The L2ME Transaction Protocol is an upper sub-layer protocol in the L2ME that uses multiple L2ME Waves to achieve network-wide transactions. In general, all the L2ME transactions comprise j+1 Waves (where j=0, 1, 2 . . . ) and are started by either an EN or the NC node. An EN may be any network node, including the NC node, which initiates an L2ME transaction based on an end-user application. In the final L2ME Wave, the requested results are returned to the EN by the NC node. The L2ME transaction is completed when the requested network nodes provide their final responses. In one embodiment, only one L2ME transaction is carried out or pending at any given time within the network. For a failed L2ME Wave, the resultant NC node action depends on the specific L2ME transaction type and the Wave number.

Figure 3:
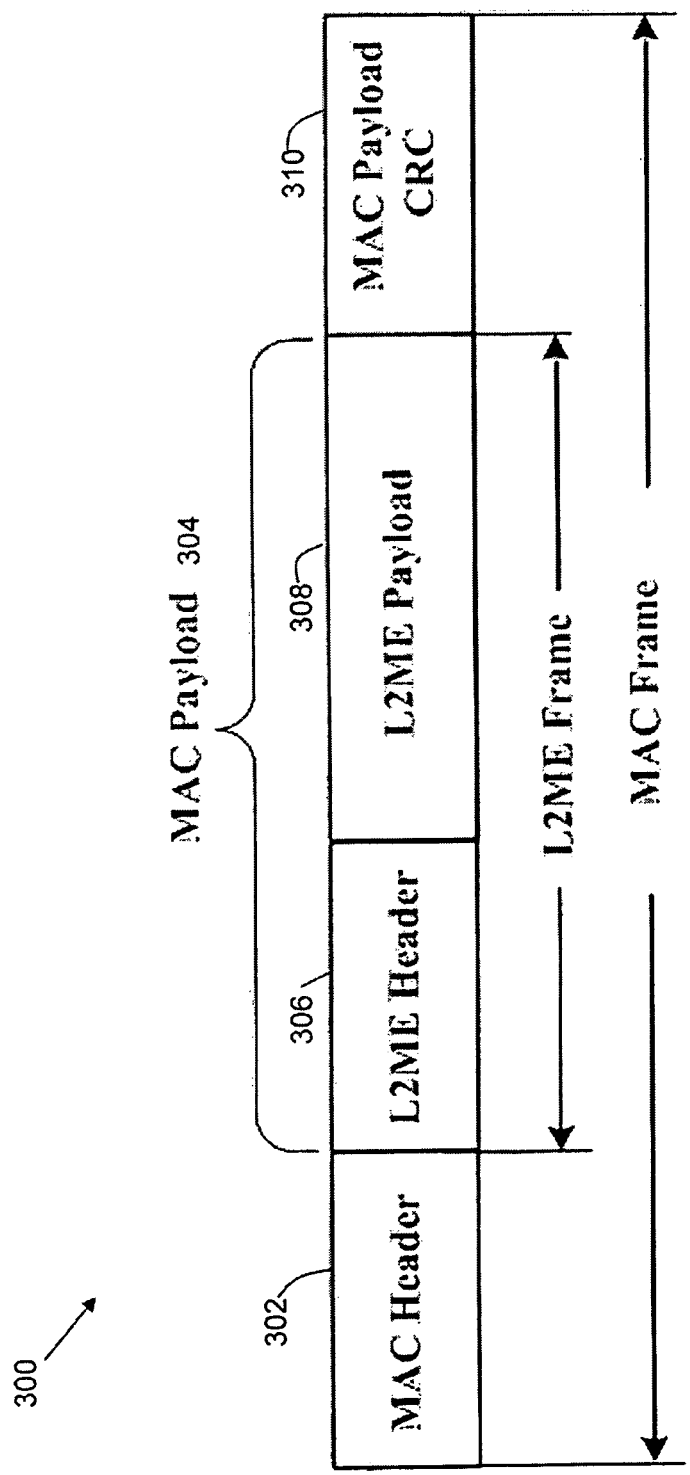
FIG. 3 illustrates a block diagram of an L2ME Frame in accordance with the embodiment of FIG. 1.

In general, all L2ME transaction messages may be classified into three different categories during a transaction. The messages are classified as follows: (1) Submit; (2) Request; and (3) Response. Nodes that do not use L2ME messages, such as legacy nodes not configured with an L2ME, may simply drop these messages. A node not configured with an L2ME may receive an L2ME message because the L2ME messages are embedded within the preexisting MAC messaging framework. FIG. 3 illustrates one example of a MAC frame 300. MAC frame 300 includes a MAC header 302, a MAC payload 304, and a MAC payload cyclic redundancy check (CRC) 310. L2ME frames are embedded within the MAC payload 304 and include an L2ME header 306 and an L2ME payload 308.

Submit L2ME Messages

The Submit L2ME messages carry application-initiated requests from an EN to the NC node where an L2ME Wave transaction may be initiated. An EN is usually responsible for managing the various stages of a transaction while the NC node is responsible for broadcasting the Request, gathering the Response of each node, and providing the transaction results to the EN that transmitted the Submit message. Table 1 below illustrates one example of a Submit L2ME Frame format, which includes a Submit L2ME Frame header and payload.

field in the Submit and Request L2ME messages that indicates a vendor-specific use of various fields of the messages. For example, the assigned VENDOR ID range for Entropic Communications is 0x0010 to 0x001F, and the values 0x0000 to 0x000F are assigned to MoCA. The length of the L2ME_PAYLOAD field may be shorter or equal to L_SUB_MAX. Also note that Submit and Request messages associated with a given L2ME transaction may have an

TABLE 1

Submit L2ME Message Format

| Field | Length | Usage |
|---|---|---|
| *Submit L2ME Header* | | |
| HDR_FMT | 8 bits | 0x8 |
| ENTRY_NODE_ID | 8 bits | The ID of the node sending this message. |
| ENTRY_INDEX | 8 bits | An Entry node provided value; MAY be used by Entry node to track responses to this Submit message |
| RESERVED | 8 bits | 0x0; Type III |
| VENDOR_ID | 16 bits | |
| TRANS_TYPE | 8 bits | Type of L2ME transaction defined for VENDOR_ID=0; All other values are reserved<br>If VENDOR_ID=0<br>    0x1=PQoS transactions<br>    0x2=FMR<br>The use of this field for other values of VENDOR_ID is vendor specific |
| TRANS_SUBTYPE | 8 bits | Subtype of L2ME transaction defined for a VENDOR_ID and TRANS_TYPE; all values are reserved except for<br>If VENDOR_ID = 0<br>    If TRANS_TYPE=0x1<br>        0x1=CREATE<br>        0x2=UPDATE<br>        0x3=DELETE<br>        0x4=LIST<br>        0x5=QUERY<br>        0x6=MAINTENANCE<br>    If TRANS_TYPE=2<br>        0x1=FMR transaction<br>The use of this field for other values of VENDOR_ID is vendor specific |
| WAVE0_NODEMASK | 32 bits | Nodemask specifying nodes that are part of the L2ME Wave 0 |
| RESERVED | 32 bits | 0x0; Type III |
| RESERVED | 8 bits | 0x0; Type III |
| MSG_PRIORITY | 8 bits | Allowed values: 0xFF where 0xFF is the highest priority; NC node MAY process received Submit messages based on MSG_PRIORITY field value |
| TXN_LAST_WAVE_NUM | 8 bits | Allowed values 0x00-0x04; value=the [total number of Waves −1] in an error free transaction |
| RESERVED | 8 bits | 0x0; Type III |
| *L2ME Transaction Payload* | | |
| L2ME_PAYLOAD | 0-N bytes | L2ME payload is L2ME Wave and transaction specific |

The Submit L2ME Frame header includes an 8-bit ENTRY_TXN_ID field. The ENTRY_TXN_ID field is the Entry Node's transaction ID, which starts at "1" and is incremented each time a Submit message is sent to the NC node. The EN_TXN_ID=0 value is reserved for the NC node when there is no EN. Any L2ME transaction that results from a Submit message may contain this transaction ID. Note that a combination of the Entry node ID with the transaction ID uniquely identifies each L2ME transaction in the network allowing an EN to know that its transaction has been triggered. Additionally, uniquely identifying each transaction allows the EN to recognize and cancel any attempt by the NC node to start a transaction if the EN has already timed out waiting for the transaction to begin. The composition and length of the L2ME_PAYLOAD field depends on the specific VENDOR_ID, TRANS_TYPE, and TRANS_SUBTYPE fields. The VENDOR_ID is a 16-bit identical set of VENDOR_ID, TRANS_TYPE, and TRANS_SUBTYPE fields.

Request L2ME Messages

Request L2ME Frame messages are broadcast to all nodes by the NC node during a transaction Wave. In one embodiment in which a Submit message has been received by the NC node, the NC node will broadcast a Request L2ME Frame message as a consequence of the Submit message. In some cases, when an NC node is acting as the EN, as described below, no Submit message is transmitted and the NC node initiates the transaction by issuing the Request L2ME Frame message on its own behalf. For example, when the NC node initiates a management transaction, a Submit L2ME Frame is not needed and the transaction begins with the Request L2ME Frame. Each node receiving a Request L2ME Frame message is expected to respond to the NC node with results of the transaction as requested by the NC node in the payload. Table 2 shows the Request L2ME Frame message header and payload format, which is similar to the Submit L2ME Frame format where the MAC header is not shown.

TABLE 2

Request L2ME Frame Message Format

| Field | Length | Usage |
|---|---|---|
| *Request L2ME Transaction Header* | | |
| HDR_FMT | 8 bits | 0x9 |
| ENTRY_NODE_ID | 8 bits | The ID of the Entry node that requested the transaction; 0xFF=no Entry node |
| ENTRY_INDEX | 8 bits | Copied from initiating Submit; 0=no Entry node |
| WAVE_SEQ_N | 8 bits | An NC counter, which is held constant for all the L2ME Wave Cycles in an L2ME Wave, and is incremented when a new L2ME Wave starts; |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0 If there is an Entry node, copied from initiating Submit field WAVE0_NODEMASK |
| CYCLE_NODEMASK | 32 bits | The subset of WAVE_NODEMASK where the NC node is to receive a Response in this Wave Cycle; |
| WAVE_STATUS | 8 bits | Bits 7:3 reserved Type III Bit 2: RESP_FAIL - 1 if response was not received from the requested node in previous Wave. This indicates to all nodes that this is the last L2ME Wave due to transaction failure; otherwise = 0 Bit 1: reserved Type III Bit 0: FINAL_SUCCESS - 1 if the NC node declare this Wave as the last Wave with no errors; otherwise = 0 |
| DIR_LEN | 8 bits | 0x10 - If L2ME_PAYLOAD field has payload type "concatenated"; otherwise 0x0 |
| TXN_SEQ_N | 8 bits | A transaction sequence number, which is held constant for all the L2ME Waves in an L2ME transaction, and is incremented by the NC node when by a new L2ME transaction starts |
| TXN_WAVE_N | 8 bits | Wave number within the L2ME transaction, starting with 0 for initial Wave, and incremented by 1 for each subsequent Wave. |
| *L2ME Transaction Payload* | | |
| L2ME_PAYLOAD | 0-N bytes | One of four different payload types described below. |

In this message, the ENTRY_NODE_ID is copied from the initiating SUBMIT message. If the Request message results from an L2ME transaction without an EN, such as an NC management transaction, then the ENTRY_NODE_TXN_ID has no meaning and the field value is reset to "0". The WAVE_NODEMASK value is identical to the Submit message if this is the first L2ME Wave. In the last L2ME Wave in the transaction, the value of this field contains the set of nodes that are to be part of the last Wave. Otherwise, the WAVE_NODEMASK value corresponds to the set of nodes that provided a Response in the IN_NEXT_WAVE bit of the previous Request. The CYCLE_NODEMASK is the bitmask of the nodes where each bit position corresponds to the node ID (i.e., bit 0 value corresponds to node ID=0). The bit corresponding to each node is set if the node is instructed by the NC node to provide a Response upon receiving the Request message. In addition, the Request message includes the WAVE_STATUS field, which indicates if the previous Wave Cycle failed or completed successfully. Note that the allowed values in the WAVE_STATUS field are 0, 1, 2 and 4, and if the RESP_FAIL and/or NC_CANCEL_FAIL bits are set, this is the last L2ME Wave of the transaction and any following Wave may contain the L2ME_PAYLOAD field of the failed transaction.

The payload of the Response frame for the L2ME Waves (except for Wave 0) is typically formed by concatenating the Responses from the nodes in the previous wave. The concatenation is formed as follows: when a Response L2ME Frame arrives at the NC node from a given node, its payload is appended to the end of a Response queue at the NC node. Then, the length of the payload is written into a data structure, called a directory, and the node's ID is transmitted. When the NC node is ready to send the next Request L2ME Frame, it places the length of the directory into a DIR_LEN field, copies the directory into the beginning of the payload, and then copies the Response queue into the remainder of the payload.

The DIR_LEN field indicates the length of a directory in the payload portion of the Request L2ME Frame message. There are four different types of L2ME_PAYLOAD fields that are used in a Request L2ME Frame message, which are as follows:

1. The first type of L2ME_PAYLOAD is identical to the payload of the Submit message if it is the first L2ME Wave of a given transaction. The length of this L2ME_PAYLOAD field may be less than or equal to L_SUB_MAX, which is the maximum number of bytes in the concatenated Submit L2ME Frame payload.

2. The second type of Request L2ME Frame payload is sent as a report from the NC node to the participating nodes starting from the second through the final Wave of the transaction as shown in Table 3 below. The L2ME_PAYLOAD field comprises a 16-entry directory with a 2 byte entry from each node, and a RESP_DATA field, which is a concatenation of the variable-length Response L2ME Frame from each of the participating L2ME nodes that provided a Response in the previous Wave. This directory enables the receiving node to decode the L2ME Responses from all the nodes.

TABLE 3

Request "Concatenated" L2ME Frame Payload Format

| Field | Length | Usage |
|---|---|---|
| Request L2ME Frame Concatenated Payload | | |
| For (i=0; i<N; i++) { | | N = DIR_LEN |
| DIR_NODE_ID | 8 bits | Node ID that sent Response i or 0xFF if directory entry i and subsequent directory entries are unused |
| DIR_RESP_INFO | 8 bits | Values [0 . . . (L_RESP_MAX)] indicate the length of the payload in the Response from DIR_NODE_ID in units of 4 byte words. The following values have special meanings and indicate zero length: UNRECOGNIZED = 0xFF - the node's Response header indicated it couldn't interpret the previous Request OVERFLOW = 0xFE - the node's Response could not be included given L_REQ_MAX. |
| } | | |
| RESP_DATA | 0-N words | An integral number of variable length Response payloads, parsable by traversing lengths interpreted from the directory. |

3. The third type of L2ME_PAYLOAD is in the case of a failed L2ME transaction where the RESP_FAIL bit or NC_FAIL bit is set to "1". The NC node may transmit a zero-length payload in the Request message of the final L2ME Wave.

4. The fourth type of L2ME_PAYLOAD is used to support some specific L2ME transactions such as parameterized Quality of Service. In this payload, the DIR_LEN in the Request L2ME Frame header is not used, and the NC node processes the Responses of all the nodes to produce a custom Request Frame payload. The format of the L2ME_PAYLOAD field is defined in the specific L2ME transaction. Note that Request Frames with no payload consist of a 64-bit Type III reserved field.

Response L2ME Message Format

The Response L2ME Frame format is shown in Table 4 below. Response L2ME Frames are sent unicast from each L2ME transaction capable node to the NC node at the end of each L2ME Wave. In some embodiments, the NC node may be configured to simultaneously receive multiple (e.g., three or more) Responses from the requested nodes.

TABLE 4

Response L2ME Frame Format

| Field | Length | Usage |
|---|---|---|
| Response L2ME Transaction Header | | |
| HDR_FMT | 8 bits | 0xA |
| RESP_STATUS | 8 bit | Bits 7:4 - reserved Type III Bit 3: DO_ENTRY_CANCEL=1 iff the Entry node requires during Wave 0 that the NC node not to issue further Waves in the transaction Bit 2: IN_NEXT_WAVE=1 iff the node will be included in WAVE_NODEMASK in the next Wave Bit 1: reserved Type III Bit 0: INTERPRETED=1 if the node fully recognized the Request message |
| RESERVED | 8 bits | Type III |
| WAVE_SEQ_N | 8 bits | Copied from initiating Request |
| RESERVED | 32 bits | Type III |
| L2ME Transaction Response Payload (Optional) | | |
| L2ME_PAYLOAD | 0-N words | The length is less than or equal to L_RESP_MAX; no payload in the Response if this is the final Wave of the transaction; divisible evenly by 4 |

The Response L2ME message includes a RESP_STATUS field, which indicates the response status of a node that was requested to respond in the next or final Wave Cycle. In addition, the RESP_STATUS field allows an EN to cancel a transaction it initiated by sending a Submit message to the NC node, but timed out waiting for the Response message.

If an L2ME-enabled network node receives any L2ME transaction messages with an unrecognized VENDOR_ID, TRANS_TYPE, or TRANS_SUBTYPE field value, then the node may set the RESP_STATUS field to "0" in the Response Frame and the NC node may preclude this node from future Waves in the transaction. The EN and any other node that sets the IN_FINAL_WAVE bit in any Response may be included in the WAVE_NODEMASK of the final Wave.

L2ME Transaction Overview

L2ME transactions may be initiated in multiple ways, although usually only one L2ME transaction may be carried out at any given time within a network. In one embodiment, an L2ME transaction may be initiated by an EN, which may be any node connected to the network. For example, the EN may be a MoCA network node connected to a computer. The computer may be attached to the Internet and running an application that communicates by way of a higher layer protocol interface. In this configuration, the computer may use the EN as a proxy, described in greater detail below, to monitor the entire MoCA network through L2ME messaging in response to application-generated transactions within the computer.

Figure 4:
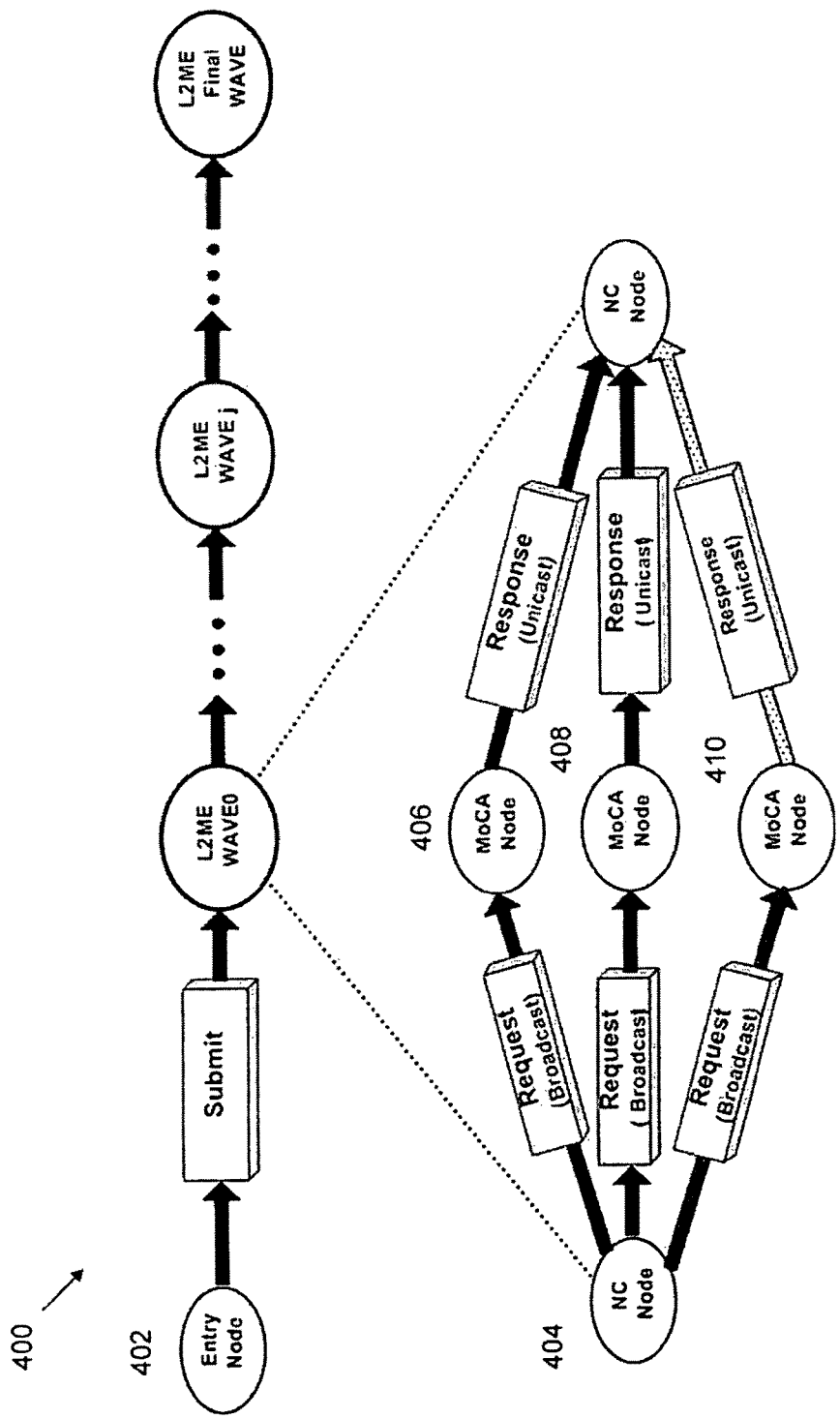
FIG. 4 is a block diagram of a Layer 2 Management Entity transaction protocol in accordance with one embodiment.

With reference to FIG. 4, one example of an EN-initiated transaction is now described. FIG. 4 illustrates a block diagram of one example of an L2ME transaction 400 initiated by EN 402. Upon receiving a request from an upper-level application, EN 402 generates and transmits a Submit L2ME message to NC node 404. NC node 404 receives the Submit message and initiates a first L2ME Wave, L2ME Wave 0, by broadcasting a Request message with a similar header to the Submit message received from EN 402. The Request message is broadcast to each of the L2ME capable nodes 406, 408, 410 specified by the WAVE_NODEMASK field contained in the payload. If this Request is sent to a node which is not L2ME capable, the node simply ignores this message.

The Request L2ME Frame message is also sent to EN 402 for reasons now described. Upon receiving the Request message, EN 402 verifies the transaction by comparing the appropriate field in the Request header with values it used in the Submit header. If the values match, the transaction will be processed. However, there may be some instances when the L2ME transaction in the network is not the most recent transaction requested by EN 402. This situation arises when the Submit message transmitted by EN 402 was corrupted, not received, or not granted by the NC node 404. If the initiated transaction is not the most recently requested L2ME transaction, EN 402 may cancel the transaction by setting the DO_ENTRY_CANCEL bit to "1" in the Response. Upon receiving a Response from EN 402 with the DO_ENTRY_CANCEL bit set to "1", the NC node 404 will not issue more L2ME Waves in this transaction, but may immediately initiate another L2ME transaction.

Assuming the L2ME transaction is not canceled by EN 402, the requested L2ME transaction-capable nodes send a Response message to NC node 404 with a payload indicating whether or not they are opting to participate in the next Wave(s) of this transaction. A node may opt not to participate in future Waves if, for example, the transaction is a parameterized QoS transaction to create a new parameterized QoS flow and the node cannot support the parameterized QoS flow. A node may opt to participate in the network transaction by setting the IN_NEXT_WAVE bit to "1" and may opt to not participate by setting the IN_NEXT_WAVE bit to "0". In the following L2ME Waves, NC node 404 typically generates the Request L2ME Frame payload by concatenating all Responses from the previous Wave as described above. The NC node 404 then sends this Request message to nodes that requested participation in the current Wave. Note that for some transaction embodiments, the NC node may produce a distinct, non-concatenated Request message payload from the received Response payloads. The transaction continues until the NC node reaches the maximum number of Waves specified in the Submit L2ME message. Upon reaching the maximum number of Waves in the transaction, NC node 404 issues the final Wave, which comprises a Request L2ME Frame message to the EN 402.

However, if NC node 404 receives Responses from all of the L2ME capable nodes with the IN_NEXT_WAVE bit set to "0" and there is an EN 402, then NC node 404 may skip intermediate Waves in the transaction and synthesize an appropriate Request payload. If the REQUEST payload would have been created using concatenation, then NC node 404 fills the directory with DIR_NODE_ID=0xFF in all of the entries and the synthesized Request may have the TXN_WAVE_N properly set for the final Wave.

In a number of L2ME transactions, NC node 404 may request only EN 402 to provide a Response to its Request message after all other nodes have responded. This Response, which completes the L2ME Wave in various transactions, ensures that the L2ME transaction has been fully completed before EN 402 notifies its application that the transaction is completed. In other L2ME transactions, the transaction is not completed until NC node 404 sends a Request to multiple nodes, including EN 402, and receives a Response from each of the nodes.

In some instances, an entire L2ME transaction may result in an error. This situation arises if, for example, (1) an L2ME Wave Cycle fails; (2) the number of executed L2ME Waves in a given transaction is less than the expected total number of L2ME Waves as indicated in the TXN_LAST_WAVE_NUM field in the initiating Submit L2ME message; and (3) the L2ME transaction was initiated by an EN. In one embodiment, if an L2ME transaction fails, NC node 404 issues a new L2ME Wave called a transaction-failed Wave. This Wave announces the termination of the transaction due to the failure of the previous L2ME Wave. The transaction-failed Wave is initiated by NC node 404 sending a Request L2ME Frame header, as defined in Table 2 above, with the WAVE_STATUS field set to "4" and the WAVE_NODEMASK having the bit corresponding to EN 402 set to "1". Additionally, the Request L2ME Frame is a zero-length payload as described above. Upon receipt of this Request, EN 402 sends a Response L2ME Frame as shown in Table 4 above.

In another embodiment, NC node 404 may autonomously initiate an L2ME transaction to inform the network nodes which other nodes are L2ME transaction-capable. These NC node initiated transactions are usually conducted in a single Wave and are designed to achieve network maintenance by providing interoperability with legacy or other compatible nodes. L2ME Wave transactions initiated by the NC node usually have the following characteristics:

1. In order to bound the Wave duration, the NC node should include at least three nodes in the CYCLE_NO-DEMASK field;
2. If the NC node does not receive the expected Response from the requested node within NC_TIMEOUT, the NC node assumes that the Response is no longer outstanding;
3. The NC node may not request a node to re-transmit its response before all the other nodes have been asked to first send their Responses; and
4. Any node that fails to provide a Response, when requested, within T21 of the second Request causes an L2ME Wave failure.

The WAVE_NODEMASK field indicates the set of nodes that are recognized by the NC node 404 as an L2ME transaction-enabled node. If the node is recognized by the NC node 404, then it responds using a zero-length Response message to complete the transaction in accordance with Table 5 below.

TABLE 5

Response L2ME-Enabled Frame Format

| Field | Length | Description |
|---|---|---|
| Response L2ME Header | | |
| HDR_FMT | 8 bits | |
| RESP_STATUS | 8 bits | Ignored by receiving node |
| RESERVED | 8 bits | Type III |
| WAVE_SEQ_N | 8 bits | Copied from initiating Request |
| RESERVED | 32 bits | Type III |
| Response L2ME Payload | | |
| RESERVED | 32 bits | 0; Type III |

Parameterized Quality of Service Architecture

One embodiment of a network parameterized Quality of Service (pQoS) segment is now described. Note that a home network may include multiple pQoS segments, such as a coaxial network, MoCA segment and an IEEE 802.11 segment. A pQoS segment may be any group of networked nodes that share the same PHY and MAC layers, which ensures that a flow entering the network at an ingress node will reach one or more egress nodes with a pQoS guarantee. A pQoS guarantee is an assurance that at least a predetermined data rate will be provided for the communication of data from the ingress node to the egress node. In one embodiment, each pQoS segment has its own ID, which is typically the MAC address of the NC node. An upper-layer pQoS logical entity may be configured to dictate how a flow can be set up across several pQoS segments. Note that all network nodes are typically operating within the same pQoS segment.

Generally, networks may be divided into three categories: (1) legacy networks, such as networks without L2ME transaction or pQoS functionality; (2) networks with parameterized QoS enabled; and (3) networks with parameterized QoS disabled. Any network node operating in an L2ME enabled network will behave as a legacy device if the node is operating in a network with other legacy devices. In one embodiment, each network node has an L2ME and pQoS functionality.

In some embodiments, pQoS will be disabled if any one of the network nodes does not support pQoS. For example, if a non-pQoS-capable node joins a pQoS-enabled network, the network will cease supporting pQoS, and will also stop creating new pQoS flows until all network nodes are pQoS capable. If a network node attempts to create a new flow, an error message will be transmitted to the network node requesting to setup the new flow. Additionally, pQoS flows will no longer be guaranteed and packets will be treated as prioritized or best effort traffic.

However, if a non-pQoS-capable node leaves the network leaving only pQoS-capable nodes, then the network may upgrade and enable pQoS transmission. Upon the upgrading to pQoS, prioritized flows will remain as prioritized flows until updated by an ingress node by an update as described below.

Figure 5:
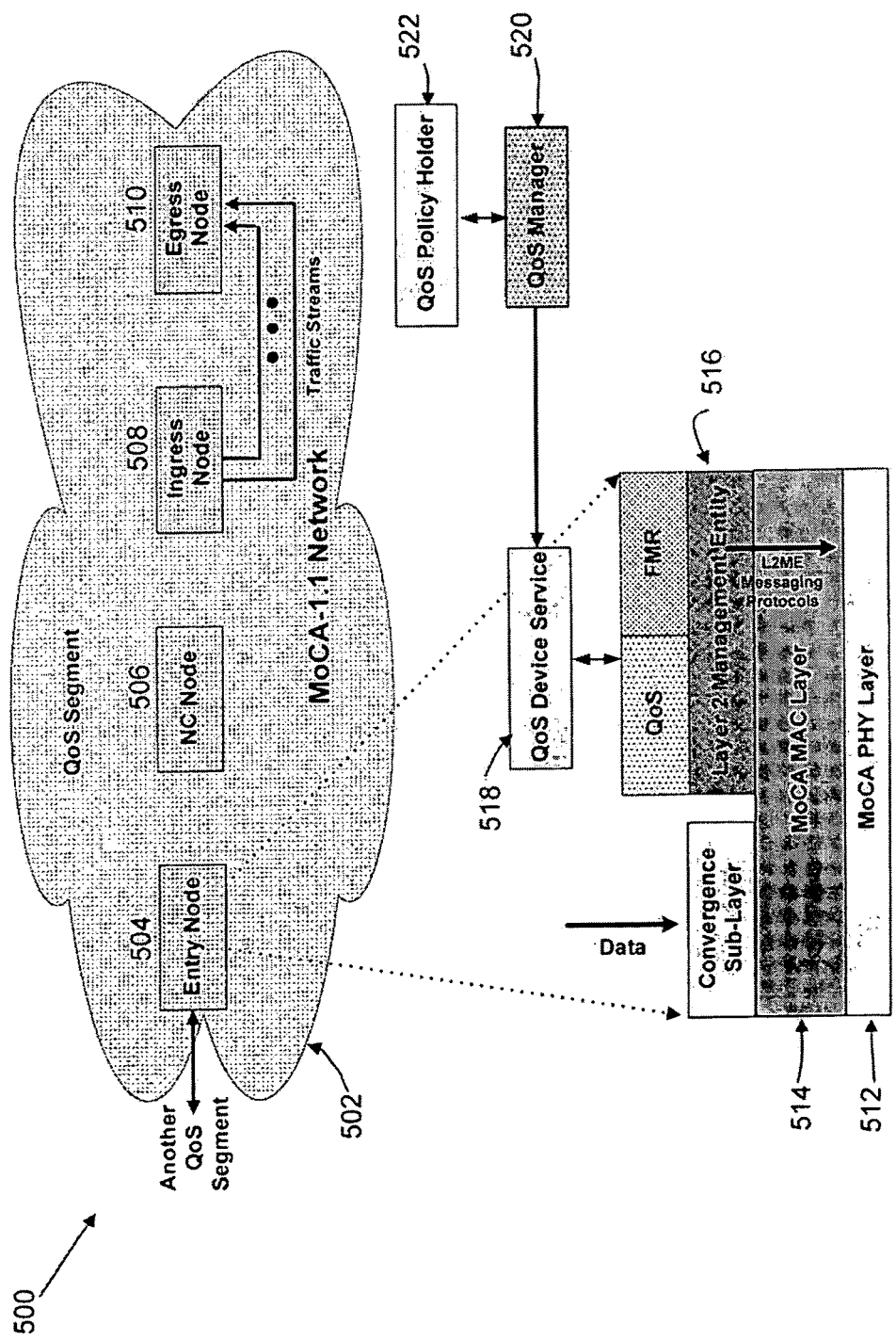
FIG. 5 illustrates an embodiment of a parameterized quality of service network architecture.

With reference to FIG. 5, one embodiment of a pQoS architecture, based on the L2ME architecture, is now described. Parameterized QoS network architecture 500 includes a network 502 having multiple nodes 504, 506, 508, 510. Network 502 may be a coordinated network including a coaxial network in accordance with the MoCA standards, a mesh network, or a wireless network. In one embodiment, each of the several nodes 504, 506, 508, 510 has a PHY layer 512, a MAC sub-layer 514, and an L2ME 516. In a UPnP Quality of Service environment, L2ME 516 interfaces to the QoS Device Service 518. In a non-UPnP environment, the L2ME interfaces to an appropriate Quality of Service application entity (not shown) for Quality of Service management. L2ME 516 is further configured to adapt messages from upper layer applications into Layer 2 compatible messages as explained in greater detail below.

The several nodes 504, 506, 508, 510 are also configured with upper level capability, which includes a QoS Device Service 518, a QoS Manager Service 520, and a QoS Policy Holder service 522. The QoS Device Service 518 receives action invocations from the QoS Manager Service 520 and reports the results of the action back to the QoS Manager Service 520. The QoS Device 518 will execute actions on its own or by utilizing a lower layer through L2ME 516.

As illustrated in FIG. 5, node 504 is an Entry node and node 506 is the NC node. Nodes 508 and 510 are ingress and egress nodes, respectively. Note that in any network 502 there may be multiple egress nodes 510. Assume, for example, that an end-user application requires a specific bandwidth for a video stream from ingress node 508 to egress node 510. A traffic stream is typically viewed as a stream with unidirectional flow from the ingress node 508 to the egress node 510. The end-user application typically is aware of the ingress node 508, egress node 510, and streamed content. The end-user application also may be aware of the Traffic Specification (TSpec XML) of the content.

TSpec XML may include a variety of parameters that describe bandwidth, packet-size, latency, and loss tolerance of the flow. Some of the bandwidth parameters include the mean data rate, peak data rate, and maximum burst size. The packet-size parameters may specify the minimum and maximum packet size as well as a nominal packet size. Latency parameters include maximum delay variation as well as the maximum and minimum service intervals.

Figure 6:
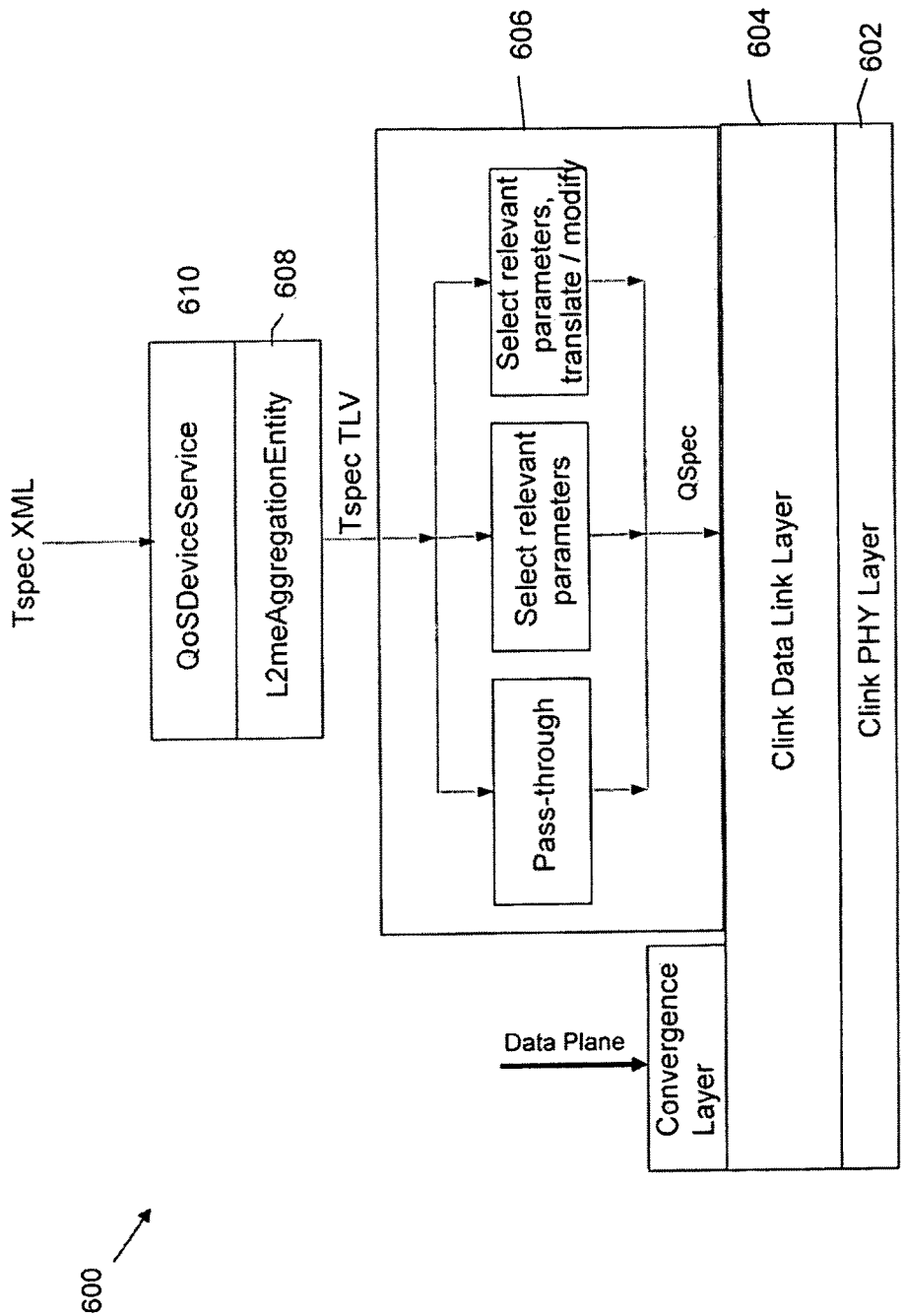
FIG. 6 illustrates a decision tree of an L2ME converting TSpec XML into QSpec.

In the pQoS environment and as shown in FIG. 6, the L2ME 606 is adapted to translate the TSpec XML into the Layer 2 specific QSpec. The L2ME 606 may translate QSpec from TSpec XML by simply using TSpec XML as QSpec, selecting some of the parameters of the TSpec XML for QSpec and ignoring other parameters, or selecting some of the parameters of TSpec XML and translating the parameters into QSpec format. Some of the QSpec parameters may include the service type, the peak data rate, the mean data rate, and the minimum, maximum, and nominal packet size.

The end-user application constructs a Traffic Descriptor and requests QoS Manager 520 to setup the required QoS resources for the requested flow. The Traffic Descriptor may include a Traffic ID defining the source and sink information, TSpec XML, and other pertinent information of the video stream for the purpose of providing parameterized QoS. QoS Manager 520, acting on behalf of the end-user application, requests the QoS Policy Holder Service 522 to provide the appropriate policy for the requested video stream as described by the Traffic Descriptor. The QoS Policy Holder service 522, which is a repository of QoS policies for the network 502, provides the QoS Manager 520 with the appropriate policy for the requested video stream. This policy may be used to set the relative importance of the traffic flow. The user importance number is used to ensure that traffic streams of the greatest importance to a user(s) receive the corresponding priority to the network resources. Based on this policy, QoS Manager 520 configures the QoS Device Service 518 thereby enabling ingress node 508 and egress node 510 to handle the new video stream. Note that the QoS Policy Holder 522 and QoS Manager 520 services may reside either on any network node 504, 506, 508, 510 or on another parameterized QoS segment.

Cost of pQoS Flow

Prior to admitting or updating pQoS flows in a network, the NC node 506 must decide if the specific flow request can be granted, e.g., if there are sufficient network resources available. The NC node 506 makes the decision on whether or not the flow should be admitted by first determining the Cost of a pQoS flow. The Cost of a Flow (CF) is a measure of the specific bandwidth required to support a given pQoS flow, and is expressed in the SLOT_TIME field (i.e., slot times, where a slot time is a unit of measure equal to 20 ns). Note that in one embodiment, the basic bandwidth unit is a time slot and not a transfer rate (e.g., Mbits/s). However, in an alternative embodiment, the CF is provided as a transfer rate.

For every Create or Update pQoS flow transaction, defined in greater detail below, the CF may be periodically calculated by the ingress node 508. The NC node 506 may use this CF calculation to decide if the requested pQoS flow is allowed in the network. The CF (multiple of SLOT_TIME/second) may be calculated as follows:

$$CF_{new} = N_{PPS}\text{MAX}\left\{T_{\text{MIN}},\left\{\left[\left(\frac{8 \cdot L_P}{OFDM_b}\right)\right](T_{CP} + T_{FFT}) + T_{IFG} + T_{PRE}\right\}\right\} \quad \text{Eq. (1)}$$

Where,

TABLE 6

List of Eq. (1) Parameters

| Parameter Name | Description |
| --- | --- |
| $N_{PPS}$ | Total number of transmitted packets/second |
| $T_{MIN}$ | Minimum packet size transmission time |
| $L_P$ | Packet length (bytes) including the RS pad |
| $OFDM_B$ | Number of bits per OFDM symbol based on PHY Profile used for the transmission |

TABLE 6-continued

List of Eq. (1) Parameters

| Parameter Name | Description |
| --- | --- |
| $T_{CP}$ | Cyclic prefix length (multiple of SLOT_TIME) |
| $T_{FFT}$ | IFFT/FFT period (multiple of SLOT_TIME) |
| $T_{IFG}$ | IFG period (multiple of SLOT_TIME) |
| $L_{PRE}$ | Length of the preamble per packet (multiple of SLOT_TIME) |

$N_{PPS}$MAX is the number of Orthogonal Frequency Division Multiplexing (OFDM) symbols/packets where ⌈x⌉ is the rounded-up integer of X, which is multiplied by the OFDM symbol length (# of SLOT_TIME/second). Note that the length of OFDM symbol depends on the network channel characteristics. After adding the preamble length and the interframe gap (IFG) length per packet, $N_{PPS}$MAX is multiplied by the total number of transmitted packets per second, which is given by the peak packet rate divided by the nominal packet size. The cost of all existing flows, N, (with no packet aggregation) for each ingress node 508 is given by:

$$CF_{node} = \sum_{i=1}^{N} CF_i \quad \text{Eq. (2)}$$

In order for the ingress node 508 to accept the new flow, its maximum available bandwidth must be greater than or equal to the cost of the current flow and the new flow. This condition is given by:

$$BW_i(\text{max}) \geq CF_{new} + CF_{node} = CF_{new} + \sum_{j=1}^{N} CF_i \quad \text{Eq. (3)}$$

Once the new pQoS flow has been accepted by the ingress node, the NC node 506 must decide if the cost of all the aggregated pQoS flows on all the nodes including the cost of the new pQoS flow is less or equal to the total maximum available network bandwidth. Assuming M nodes in the network, the total available network bandwidth must satisfy the condition:

$$0.8[BW_{NC}(\text{total}) - C(\text{overhead})] \geq CF_{new} + \sum_{j=1}^{M} CF_{node}^j \quad \text{Eq. (4)}$$

Where $BW_{NC}$ is the total network bandwidth. In some embodiments, the total available bandwidth in the network for pQoS service is 80% of the total network bandwidth minus the cost of the all overhead, which may include all link control packets, reservation requests, admission controls, and probes. If Eq. (4) is true, then the NC node 506 admits the new pQoS flow to the network. If Eq. (4) is not true, then the NC node 506 rejects the flow request and returns the available flow bandwidth (AFBQ) as follows:

$$AFBW = 0.8[BW_{NC}(\text{total}) - C(\text{overhead})] - \sum_{j=1}^{M}\sum_{i=1}^{N} CF_i^j \quad \text{Eq. (5)}$$

In order for the NC node to accept the new flow, the NodeCapacity for each of the ingress node 508 and egress node 510 must be greater than or equal to the cost of the existing flows and the new flow through that node. This condition is given by:

$$NodeCapacity(\max) \geq CF_{new} + CF_{node} = CF_{new} + \sum_{i=1}^{N} CF_i \quad \text{Eq. (6)}$$

The remaining node capacity (REM_NODE_CAPACITY) is the difference between the left and right side of Eq. (6), and is one of the bandwidth-related criteria used by the NC node 506 before permitting a specific flow creation or update. Since the most basic bandwidth requirement for a pQoS flow is the number of time-slots needed for one cycle (e.g., 1 ms) and simple mapping between a bandwidth value in number of Mbits/s and the number of time-slots at the data link layer is not straightforward due to OFDM modulation and bitloading, a conversion is typically needed to determine the number of packets needed for the flow. To find the equivalent maximum number of packets in one data link cycle and the size (in bits) of each packet, the worst case bandwidth need of a flow at the data link layer per cycle is as follows:

$$QSpec\_PeakDataRate = MaxNumberofPackets \times QSpec\_MaxPacketSize \quad \text{Eq. (4)}$$

Where,
QSpec_PeakDataRate and its conversion into time-slots are the data link layer bandwidth reserved for the flow by the NC;

$$MaxNumberofPackets = \frac{TSpec\_PeakDataRate}{TSpec\_MinimumPacketSize};$$

QSpec_MaxPacketSize=TSpec_MaxPacketSize+EthernetPacketOverhead;

TSpec_PeakDataRate over 1 ms is calculated from TSpec_PeakDataRate with TimeUnit other than 1 ms.

The TimeUnit parameter allows the specification of token bucket TSpec XML of a live traffic source to match its traffic generation process. The TimeUnit parameter also provides a convenient and flexible way to extract token bucket TSpec XML from prerecorded or legacy content regardless of whether the transport information is available. For example, for MPEG-coded video content without transport information, the PeakDataRate may be specified as the maximum number of bits within a video frame divided by the video frame duration. In this manner, the TimeUnit is the video frame interval determined by the video frame rate. If the media is PCM audio for example, TimeUnit may be equal to the reciprocal of its sampling rate. For content that is furnished with transport information such as RTP, the resolution of the RTP timestamp, which has a default of 90 KHZ, is usually used to specify TSpec XML. It is not unusual that the TimeUnit in the TSpec XML does not match the TimeUnit determined by the operational clock rate of an underlying link that is used to transport the traffic stream and a conversion of the token bucket TSpec XML specified in a different TimeUnit may be necessary.

From the definition of PeakDataRate in the token bucket model, at any interval [t1, t0], the maximum number of bits generated by a traffic source with characteristics of {r,b,p} may not exceed $p(t_1-t_0)$, for any $t_1-t_0 \geq TU_{TSPEC}$. Therefore, the maximum data rate, or PeakDataRate measured in any interval $[t_1-t_0]$, may not exceed $$\frac{p(t_1 - t_0)}{t_1 - t_0} = p.$$

Similarly, from the definition of MaximumBurstSize in the token bucket model, at any interval $[t_1-t_0]$, the maximum amount of bits generated by a traffic source with characteristics of {r,b,p} may not exceed $r(t_1-t_0)+b$, for any $t_1-t_0 \geq TU_{TSPEC}$. The maximum data rate, or PeakDataRate measured at any interval $[t_1-t_0]$ may not exceed $$\frac{r(t_1 - t_0) + b}{t_1 - t_0} = r + \frac{b}{t_1 - t_0}.$$

Therefore, combining both of the above constraints, the PeakDataRate measured at the operational clock rate $c_{oper}$ (denoted by $p_{oper}$) for any time unit of $TU_{oper}(>TU_{TSPEC})$ determined by operational clock rate $C_{oper}$, is given by:

$$p_{oper} = \min\left(p, r + \frac{b}{t_1 - t_0}\right) \quad \text{Eq. (6)}$$

$$= \min\left(p, r + \frac{b}{TU_{oper}}\right) \min(p, r + bc_{oper})$$

Parameterized QoS Flow Guarantee

The pQoS flow guarantee means that the pQoS-enabled network is able to support the flow provided that the CF does not exceed the available network bandwidth. This means that a new pQoS flow will not be admitted into the network unless the flow's peak data rate/nominal packet size ($N_{pps}$) can be supported at any given time. Note that either the ingress node 508 or the NC node 506 may permit a flow's ingress peak packet rate to instantaneously exceed the peak data rate/nominal data size that can be supported by the network.

In one embodiment, NC node 506 may guarantee that a portion of the total network bandwidth is set aside for prioritized traffic and the remainder of the traffic is used for parameterized traffic. For example, NC node 506 may set aside 20% of the total network bandwidth for prioritized traffic and the remaining 80% of the bandwidth is set aside for parameterized traffic. Prioritized traffic includes asynchronous stream traffic and asynchronous data traffic. Asynchronous stream traffic, for example a video stream, requires the knowledge of the average data rate of the stream. Accordingly, the QoS Manager 520 is able to request admission or obtain information about the availability of bandwidth for asynchronous stream traffic. If the prioritized bandwidth is not available due to heavy network loading, the stream will not be admitted and the source (ingress node 508) may then attempt to send the traffic as asynchronous data traffic. The QSpec for asynchronous stream traffic includes a service-type parameter and a maximum packet size parameter.

Asynchronous data traffic, for example a file transfer, is traffic for which there is no required or predictable bandwidth. Asynchronous data traffic can also include best effort traffic, e.g., traffic that does not have a VLAN-tag indicating its priority. In one embodiment, best effort traffic does not go through the admission process described below. Network control and flow management traffic are typically regarded as prioritized traffic. However, in certain applications where short and predictable latency are required, network control and flow management traffic may be structured to use the parameterized flow bandwidth (e.g., pull-mode DVR playback or DTCP localization constraint where the round-trip time of management exchange is limited to 7 ms). Alternatively, network control and flow management traffic may be treated as high-priority asynchronous traffic. When treated as high-priority asynchronous data traffic, the bandwidth set aside for the prioritized traffic should be larger than needed for network management and stream management traffic so that these management messages can be sent in a timely fashion.

When requesting bandwidth for pQoS flow, all nodes may set the PRIORITY field in the data/control Reservation Request Element Frame to 0x3 as shown in Table 7 below. NC node 506 coordinates the scheduling of the flows within network 502. Three priority levels are supported at the network level: (1) high priority including network and stream management; (2) middle priority including asynchronous streams; and (3) low priority including asynchronous traffic without a priority tag, such as best effort traffic. When scheduling flows, NC node 506 schedules pQoS flows on a first-in first-out basis. In one embodiment, these pQoS flows are scheduled before any non-pQoS flows are scheduled.

TABLE 7

Data/Control Reservation Request Element Frame Format with Revised Priority Field

| Field | Length | Usage |
|---|---|---|
| FRAME_SUBTYPE | 4 bits | If FRAME_TYPE = Control<br>0x0 - Type I/III Probe Report<br>0x1 - Reserved<br>0x2 - Reserved<br>0x3 - Key distribution<br>0x4 - Dynamic Key distribution<br>0x5 - Type I/III Probe Report Request<br>0x6 - Link Acknowledgement<br>0x7 - Reserved<br>0x8 - Periodic Link Packet<br>0x9 - Power Control<br>0xA - Power Control Response<br>0xB - Power Control Acknowledgement<br>0xC - Power Control Update<br>0xD - Topology update<br>0xE - Unicast MAC Address Notification<br>0xF - Reserved<br>If FRAME_TYPE = Ethernet Transmission<br>0x0=ETHERNET_PACKET |
| FRAME_TYPE | 4 bits | 0x2=Control<br>0x3=Ethernet Transmission |
| DESTINATION | 8 bits | Node ID of the destination node |
| PHY_PROFILE | 8 bits | Indicates the type of modulation scheme used for this transmission<br>bits 7:6<br>00=profile sequence 0<br>01=profile sequence 1<br>bits 5:0<br>0x2=Diversity Mode profile<br>0x7=Unicast profile<br>0x8=Broadcast profile<br>All other values reserved. |
| REQUEST_ID | 8 bits | A sequence number associated with the request. |

TABLE 7-continued

Data/Control Reservation Request Element Frame Format with Revised Priority Field

| Field | Length | Usage |
|---|---|---|
| PARAMETERS | 12 bits | Reserved |
| PRIORITY | 4 bits | If FRAME_TYPE = Control<br>0x0<br>If FRAME_TYPE = Ethernet Transmission<br>0x0-Low Priority<br>0x1-Medium Priority<br>0x2-High Priority<br>0x3-Parameterized Quality of Service flow |
| DURATION | 16 bits | Transmission time required in multiples of SLOT_TIME |

Some pQoS flow may be a variable bit rate (VBR) flow. Since the peak data rate of a VBR flow is larger than its average rate and a flow uses its average rate over a long period of time, a significant part of the parameterized flow bandwidth may not be used by the flow. To maximize bandwidth, the unused bandwidth of a VBR flow is made available to the asynchronous traffic. Accordingly, the actual asynchronous bandwidth typically has two components: (1) a pre-set portion for asynchronous traffic and (2) the reclaimed portion from the parameterized flow bandwidth.

Parameterized QoS Transactions

In the embodiment illustrated in FIG. 5, parameterized QoS transactions may be initiated by either the NC node 506 or by an Entry node 504. EN-initiated transactions typically comprise two pQoS Waves and are usually initiated with a Submit message being sent unicast to the NC node 506. It is important to note that EN 504 input may be from another pQoS segment outside of network 502. Upon receipt of the Submit message, NC node 506 typically starts the first Wave by broadcasting a Request message to all network nodes 504, 508, 510 asking for specific pQoS flow information to be returned. In the second Wave, NC node 506 typically broadcasts the information received from the Responses from the network nodes in the first Wave.

In contrast, pQoS transactions initiated by NC node 506 typically comprise only a single pQoS Wave. The pQoS Wave is initiated by NC node 506 broadcasting a Request message to all the nodes 504, 508, 510 requesting a specific action to take place. The Wave is completed when a Response is received by the NC node 506 from each of the requested network nodes 504, 508, 510.

Each of the supported pQoS flows may be transmitted either in a unicast or broadcast flow. Note that multicast flows within a network are typically handled as broadcast flows where the egress node ID is 0x3f. A broadcast flow is a pQoS flow transmitted to all the network nodes in the network. NC node 506 may delete a unicast flow if the ingress node 508 or egress node 510 is disconnected from the network 502. In contrast, broadcast flows are usually not deleted for network topology reasons, except for when an ingress node 508 is disconnected from the network.

Create and Update Parameterized QoS Flow Transactions

Figure 7:
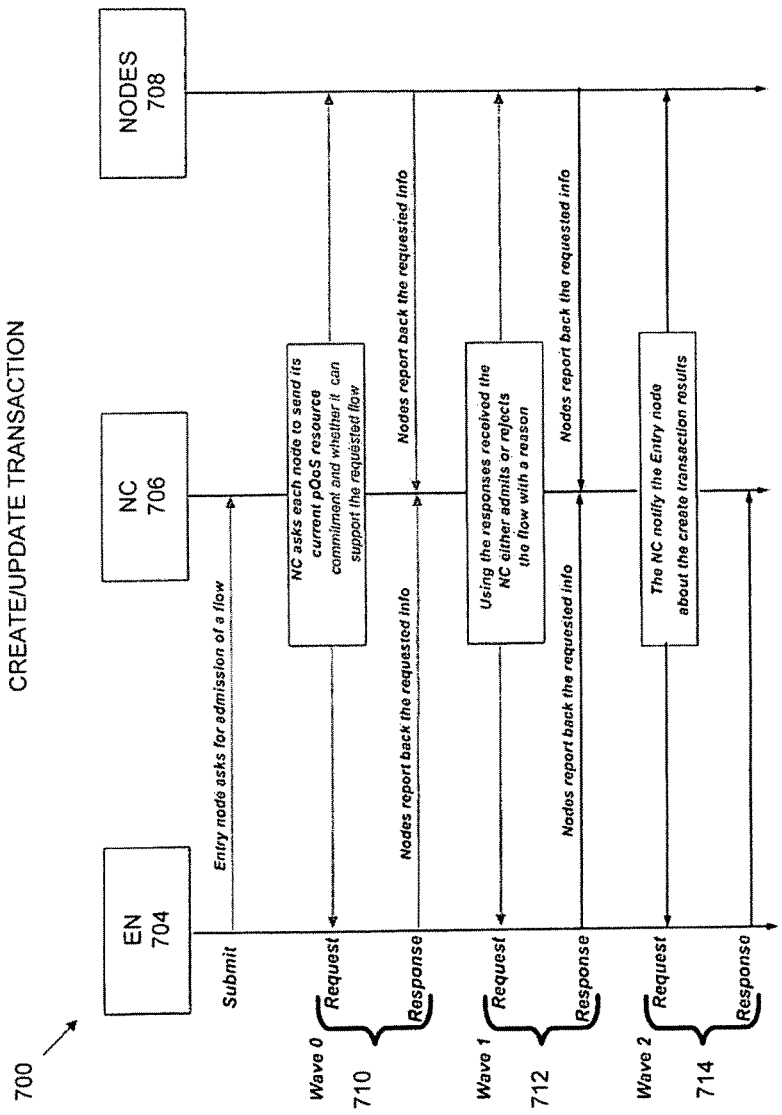
FIG. 7 is a diagram showing a Create/Update transaction in accordance with the embodiment of FIG. 5.

With reference to FIG. 7, one example of a Create/Update transaction in accordance with the embodiment shown in FIG. 5 is now described. The purpose of a Create or Update transaction is to create a new pQoS flow or update the pQoS flow attributes between the ingress node 508 and egress node 510 as shown in FIG. 5. Initially, QoS Manager 520 receives the IP and MAC addresses for both the ingress node 508 and egress node 510 as well as the QoS Devices of the flow path from the QoS Device Service 518. The path of the pQoS flow is then determined by the QoS Manager 520 by comparing the ReachableMAC value reported by the QoS Device Service 518 with the MAC addresses of the ingress node 508 and the egress node 510 until a path is found.

TABLE 8

Submit L2ME Header and Payload Format for Create/Update

| Field | Length | Usage |
|---|---|---|
| L2ME SUBMIT Header for CREATE and UPDATE | | |
| HDR_FMT | 8 bits | |
| ENTRY_NODE_ID | 8 bits | The ID of the Entry node initiating this transaction |
| ENTRY_INDEX | 8 bits | |
| RESERVED | 8 bits | |
| VENDOR_ID | 8 bits | 0=MoCA |
| TRANS_TYPE | 8 bits | 1=pQoS |
| TRANS_SUBTYPE | 8 bits | 1: Create; 2: Update |
| WAVE_NODEMASK | 32 bits | All nodes in the network |
| MSG_PRIORITY | 8 bits | 240 |
| TXN_LAST_WAVE_NUM | 8 bits | 2 |
| RESERVED | 8 bits | 0x0; Type III |
| Submit Payload for Create and Update | | |
| FLOW_ID | 48 bits | pQoS flow L2 ID |
| RESERVED | 16 bits | 0x0; Type III |
| RESERVED | 24 bits | 0x0; Type III |
| INGRESS_NODE_ID | 8 bits | If TRANS_SUBTYPE=1, Node ID for the ingress of the flow; otherwise ignore |
| RESERVED | 24 bits | 0x0; Type III |
| EGRESS_NODE_ID | 8 bits | If TRANS_SUBTYPE=1, Node ID for egress of unicast flow or 0x3f is for a broadcast flow; otherwise ignore |
| L2ME_DATA | 32 bits | Application specific defined content-optional field for sending node and mandatory for receiving node for up layer. |
| RESERVED | 64 bits | Type III |
| TV ENTRIES (up to 3 entries) | | |
| For (i=0; i<N; i++){ | | N=number of TV entries |
| TAG NAME | 8 bits | Tags are defined in |
| TAG VALUE | 24 bits | Value associated with tag |
| } | | |

TABLE 9

Defined Tags for TV entries

| TAG Name | Tag # | Tag Value Description |
|---|---|---|
| END OF TV LIST | 0 | ignored |
| PEAK_DATA_RATE | 2 | 0-0xFFFFFE; Peak data rate (kb/s) 0xFFFFFF = only for query and no pQoS flow is created or updated; |
| NOM_PACKET_SIZE | 9 | Nominal packet size (bytes) - Required; see |
| LEASE_TIME | 20 | Lease time (seconds) - Optional (default = 0; permanent) |
| RESERVED | All others | Reserved for future use; MoCA-1.1 node ignore |

A pQoS flow may be identified by a flow ID. In one embodiment, the flow ID is the multicast destination MAC Ethernet address and the packets are routed on the pQoS flow. The tag-value (TV) field has of up to 24 different pQoS entries. Each pQoS TV entry comprises an 8-bit tag field followed by a 24-bit tag value field. Table 9 shows an example of a list of pQoS tags for the TV entries. Note that tag "0" indicates the current TV and any following TV entries can be ignored. PEAK_DATA_RATE values outside the range may be interpreted as a special case to query the available bandwidth without creating the flow. The LEASE_TIME field indicates the duration after which the ingress node 508 (shown in FIG. 5) may stop treating the associated traffic as a pQoS flow and release the resources associated with the flow.

In one embodiment, a pQoS transaction is initiated when the NC node 506 receiving a Submit message from an EN 704. Note that EN 704 may send the Submit message in response to an upper layer application such as the QoS Device Service 518 (shown in FIG. 5). After receiving the Submit message from EN 704, NC node 706 transmits a Request message to all nodes 704, 708 connected to the network thereby starting the first wave (Wave 0) 710. The first wave 710 is used to inform all the network nodes 704, 708 about the proposed pQoS flow Create or Update transaction and collect metrics about current flow allocations from the nodes.

Upon receiving the Request L2ME message, ingress node 508 and egress node 510 (both shown in FIG. 5) use the TSpec XML value to calculate the time slots needed for the flow as well as the resources needed from each node, such as system bus bandwidth and memory. Each requested node may respond to the NC node 706 with a Response L2ME Frame indicating the aggregated costs of existing pQoS flows to complete the first L2ME Wave. Note that if a node receives the Request L2ME Frame and is not involved in the flow, it may simply ignore the message. One example of a Response message format for a Create/Update transaction is specified in Table 10 below. Note that if NC node 706 does not receive a Response L2ME Frame from the ingress node 508 or the egress node 510 within a given time interval, then NC node 706 will rebroadcast the Request L2ME message up to a number of times, e.g., three times, before treating the message as failed.

nominal packet size for each flow. Additionally, the nodes 704, 708 calculate the COST_TPS value as the cost of the new or updated flow in SLOT_TIME/second according to Eq. (1). Values for PEAK_DATA_RATE=0 are excluded. If there are ingress or egress node limits on the flow throughput (bits/second), the nodes 704, 708 calculate the remaining node capacity in bits/second (REM_NODE_CAPACITY) and identify the reason using the VETO_CODE field (node's capacity definition). One example of a format of the Response L2ME Frame for Wave 1 is shown in Table 15 below.

There are several scenarios in which a node may be unable to fulfill the Request issued by NC node 706. In these cases, the node issues a VETO_CODE. Examples of VETO_CODEs are shown in Table 11 below. INVALID_TV is issued if one or more of the following statements are TRUE about the TV set as received by NC node 706:

1. PEAK_DATA_RATE is not present.
2. NOM_PACKET_SIZE is not present.
3. NOM_PACKET_SIZE value<64 B or >1518 B

TABLE 10

Response L2ME Message Format for Create/Update (Wave 0)

| Field | Length | Usage |
|---|---|---|
| Response L2ME Header for Create/Update | | |
| HDR_FMT | 8 bits | 0x8 |
| RESP_STATUS | 8 bits | Bits 7:4 - reserved Type III<br>Bit 3: DO_ENTRY_<br>Bit 2: IN_NEXT_WAVE - set to '1' if the node is ingress for the flow; otherwise = implementation specific<br>Bit 1: reserved Type III<br>Bit 0: INTERPRETED - '1' |
| RESERVED | 8 bits | Type III |
| WAVE_SEQ_N | 8 bits | Copied from initiating Request |
| RESERVED | 32 bits | Type III |
| Response L2ME Payload for Create/Update | | |
| RESERVED | 8 bits | Type III |
| VETO_CODE | 8 bits | As defined in Table 11 |
| RESERVED | 16 bits | Type III |
| EXISTING_TPS | 32 bits | Duration in multiple of SLOT_TIME/second of the set of existing flows for which this node is an ingress node |
| EXISTING_PPS | 32 bits | Packets/second of the set of existing flows for which this node is the ingress node |
| COST_TPP | 32 bits | Ingress node's cost of new or updated flow (multiple of SLOT_TIME/packet); If not an ingress node set to "0" |
| REM_NODE_CAPACITY | 32 bits | For the requested flow's nominal packet size, the peak data rate (kb/s) that this node can commit to this flow. This value may be may be more or less than the requested peak data rate. If this node is not ingress or egress node, set to 0xFFFFFFFF |

Each requested node 704, 708 generates the Response L2ME Frame by calculating the EXISTING_TPS value for all the existing flows excluding the new or updated flow in which the node is an ingress node. This value is calculated by using Eq. (1) for each flow. The nodes 704, 708 also calculate the EXISTING_PPS value for all the existing flows excluding the new or updated flow. The EXISTING_PPS value is the sum of the peak data rate/

TABLE 11

List of Acceptable VETO Code Values

| VETO CODE NAME | Value | Description |
|---|---|---|
| VETO_CODE_INGRESS_OK | 1 | Node is the Ingress node (both Create & Update flows) |
| VETO_CODE_NONINGRESS_OK | 2 | Node is not the ingress node and does not forbid flow creation or update |
| VETO_CODE_FLOW_EXISTS | 3 | Flow is already exist on the node —node veto the creation of the same flow (only for Create flows) |

TABLE 11-continued

List of Acceptable VETO Code Values

| VETO CODE NAME | Value | Description |
| --- | --- | --- |
| VETO_CODE_INSUF_INGR_BW | 4 | Ingress node has bandwidth limitation, preventing a flow from being created as specified (both Create & Update flows) |
| VETO_CODE_INSUF_EGR_BW | 5 | Reserved |
| VETO_CODE_TOO_MANY_FLOWS | 6 | Node has already too many existing flows - (only for Update flow) |
| VETO_CODE_INVALID_FLOW_ID | 7 | The requested flow ID is not usable as a Quality of Service flow ID by the ingress node - (Only for Create flows) |
| VETO_CODE_INVALID_TV | 8 | |
| VETO_CODE_INVALID_NODE_ID | 9 | Node ID became invalid during network operation both |
| VETO_CODE_LEASED_EXPIRED | 10 | Update only |

Before the NC node 706 may initiate the second wave (Wave 1) 712, it needs to determine if the outcome of the Create or Update transaction is either (1) denied because a node provided non-bandwidth-related reasons for the requested flow, (2) denied because of bandwidth limitation, or (3) allowed to commit flow resources as requested.

If NC node 706 determines that the requested flow resources may be committed for a Create or Update transaction, it may send a Request L2ME Frame with a zero-length payload to the participating nodes in Wave 1 to commit the requested resources.

TABLE 12

Non-Bandwidth-Related VETO Codes and Rollback Reasons

| VETO CODE NAME | Non-Bandwidth ROLLBACK_REASON NAME |
| --- | --- |
| VETO_CODE_FLOW_EXISTS | ROLLBACK_REASON_FLOW_EXISTS |
| VETO_CODE_TOO_MANY_FLOWS | ROLLBACK_REASON_TOO_MANY_FLOWS |
| VETO_CODE_INVALID_FLOW_ID | ROLLBACK_REASON_INVALID_FLOW_ID |
| VETO_CODE_INVALID_TV | ROLLBACK-REASON_INVALID_TV |
| VETO_CODE_INVALID_NODE_ID | ROLLBACK_REASON_INVALID_NODE_ID |
| VETO_CODE_LEASE_EXPIRED | ROLLBACK_REASON_LEASE_EXPIRED |

If any node returns one of the VETO_CODEs listed in Table 12 above, then the Request for Wave 1 contains the corresponding ROLLBACK_REASON. If one node does not return VETO_CODE_INGRESS_OK, then the REQUEST for Wave 1 contains ROLLBACK_REASON_FLOW_NOT_FOUND as shown in Table 14 below.

NC node 706 evaluates and ensures the following three bandwidth-related criteria are met before permitting a specific flow Create or Update:
1. Aggregated TPS—the sum of EXISTING_TPS and COST_TPS values from all nodes may be less than QUALITY OF SERVICE_TPS_MAX
2. Aggregated PPS—the sum of EXISTING_PPS and $N_{pps}$ values from all nodes may be less than QUALITY OF SERVICE_PPS_MAX.
3. Ingress or egress node capacity—the returned REM_NODE_CAPACITY value at the ingress or egress nodes may be greater than or equal to the requested flow PEAK_DATA_RATE.

If any one of these bandwidth-related criteria fails, then NC node 706 may calculate the MAX_PEAK_DATA_RATE (THRESHOLD_BPS) value in the payload of the Request Frame. The MAX_PEAK_DATA_RATE is the maximum allowable flow PEAK_DATA_RATE (bits/second) that would have succeeded. NC node 706 may also specify the most limiting criteria by selecting one of the following ROLLBACK_REASONs:
1. ROLLBACK_REASON_INSUF_ING_BW,
2. ROLLBACK_REASON_INSUF_EGR_BW,
3. ROLLBACK_REASON_INSUF_AGGR_BW
4. ROLLBACK_REASON_INSUF_AGGR_PPS The second wave 712 informs the nodes about the decision of the flow Create or Update transaction. If the Create or Update transaction failed in the first wave 710, NC node 706 may send the Request L2ME Frame for the second wave 712 according to Table 13 below where THRESOLD_BPS value is only defined for the four above ROLLBACK_REASONs. Note that if an Update transaction fails, the existing pQoS flow still persists with its current TSpec XML parameters.

TABLE 13

Request L2ME Frame Payload for Failed Create/Update (Wave 1)

| Field | Length | Usage |
| --- | --- | --- |
| Request Header for Create/Update (Wave 1) | | |
| HDR_FMT | 8 bits | |
| ENTRY_NODE_ID | 8 bits | |
| ENTRY_INDEX | 8 bits | |
| RESERVED | 8 bits | 0; Type III |

TABLE 13-continued

Request L2ME Frame Payload for Failed Create/Update (Wave 1)

| Field | Length | Usage |
|---|---|---|
| VENDOR_ID | 8 bits | 0 |
| TRANS_TYPE | 8 bits | 1=QOS |
| TRANS_SUBTYPE | 8 bits | 1: Create; 2: Update |
| WAVE_NODEMASK | 32 bits | |
| CYCLE_NODEMASK | 32 bits | |
| WAVE_STATUS | 8 bits | 0x0 |
| DIR_LEN | 8 bits | Ignore |
| TXN_SEQ_N | 8 bits | |
| TXN_WAVE_N | 8 bits | 1 |
| Request Payload for Create/Update | | |
| ROLLBACK_REASON | 8 bits | ROLLBACK_REASON for failed transaction |
| BW LIMIT INFO | 8 bits | Bits 7:4 —reserved Type III<br>Bit 3: INSUF_ING_BW - set to "1" if insufficient ingress node bandwidth<br>Bit 2: INSUF_ENG_BW - set to "1" if insufficient egress node bandwidth<br>Bit 1: INSUF_AGGR_TPS - set to "1" if aggregate TPS is limited<br>Bit 0: INSUF_ING_PPS - set to "1" if aggregate TPS is limited |
| RESERVED | 16 bits | 0x0; Type III |
| MAX_PEAK_DATA_RATE | 32 bits | Maximum allowable flow peak data rate (bits/second) to create or update this flow. |

TABLE 14

List of acceptable ROLLBACK_REASON Values

| ROLLBACK_REASON NAME | Value | Description |
|---|---|---|
| ROLLBACK_REASON_FLOW_EXISTS | 3 | CREATE transaction failed due to a node already acting as ingress for the specified flow |
| ROLLBACK_REASON_INSUF_INGR_BW | 4 | Flow can't be created due to insufficient bandwidth on ingress node data path; NC provides the maximum feasible data bandwidth |
| ROLLBACK_REASON_INSUF_EGR_BW | 5 | Flow can't be created due to insufficient bandwidth on egress node data path; NC provides the maximum feasible data bandwidth |
| ROLLBACK_REASON_TOO_MANY_FLOWS | 6 | Ingress or egress nodes are unable to add the flow |
| ROLLBACK_REASON_INVALID_FLOW_ID | 7 | The requested flow ID is reserved by the node |
| ROLLBACK_REASON_INVALID_TV | 8 | Node can't accept the received TV |
| ROLLBACK_REASON_INVALID_NODE_ID | 9 | Node ID became invalid during network operation |
| ROLLBACK_REASON_LEASE_EXPIRED | 10 | Update transaction failed due to flow being deleted from the network |
| ROLLBACK_REASON_FLOW_NOT_FOUND | 16 | Update transaction failed |
| ROLLBACK_REASON_INSUF_AGGR_TPS | 17 | Insufficient flow bandwidth on the MoCA ™ network |
| ROLLBACK_REASON_INSUF_AGGR_PPS | 18 | Insufficient packets/second on the MoCA ™ network |

Upon receiving a zero-length Request for a successful Create transaction in the second wave 712, the ingress node 504 (shown in FIG. 5) for the flow may commit the requested resources. Each node 704, 708 may respond with Response message format, one example of which is shown below in Table 15. In the final wave 814, Wave 2, NC 806 notifies EN 804 about the results of the Create/Update transaction.

TABLE 15

Response L2ME Message Format for Create/Update (Wave 1)

| Field | Length | Usage |
|---|---|---|
| Response L2ME Header for Create/Update (Wave 1) | | |
| HDR_FMT | 8 bits | |
| RESP_STATUS | 8 bits | Bits 7:4 - reserved Type III |

TABLE 15-continued

Response L2ME Message Format for Create/Update (Wave 1)

| Field | Length | Usage |
|---|---|---|
| | | Bit 3: DO_ENTRY_CANCEL - '0' |
| | | Bit 2: IN_NEXT_WAVE - See |
| | | Bit 1: reserved Type III |
| | | Bit 0: INTERPRETED - '1' |
| RESERVED | 8 bits | Type III |
| WAVE_SEQ_N | 8 bits | Copied from initiating Request |
| RESERVED | 32 bits | Type III |
| Response L2ME Payload for CREATE/UPDATE | | |
| RESERVED | 32 bits | 0; Type III |

Delete Parameterized Quality of Service Flow Transaction

Figure 8:
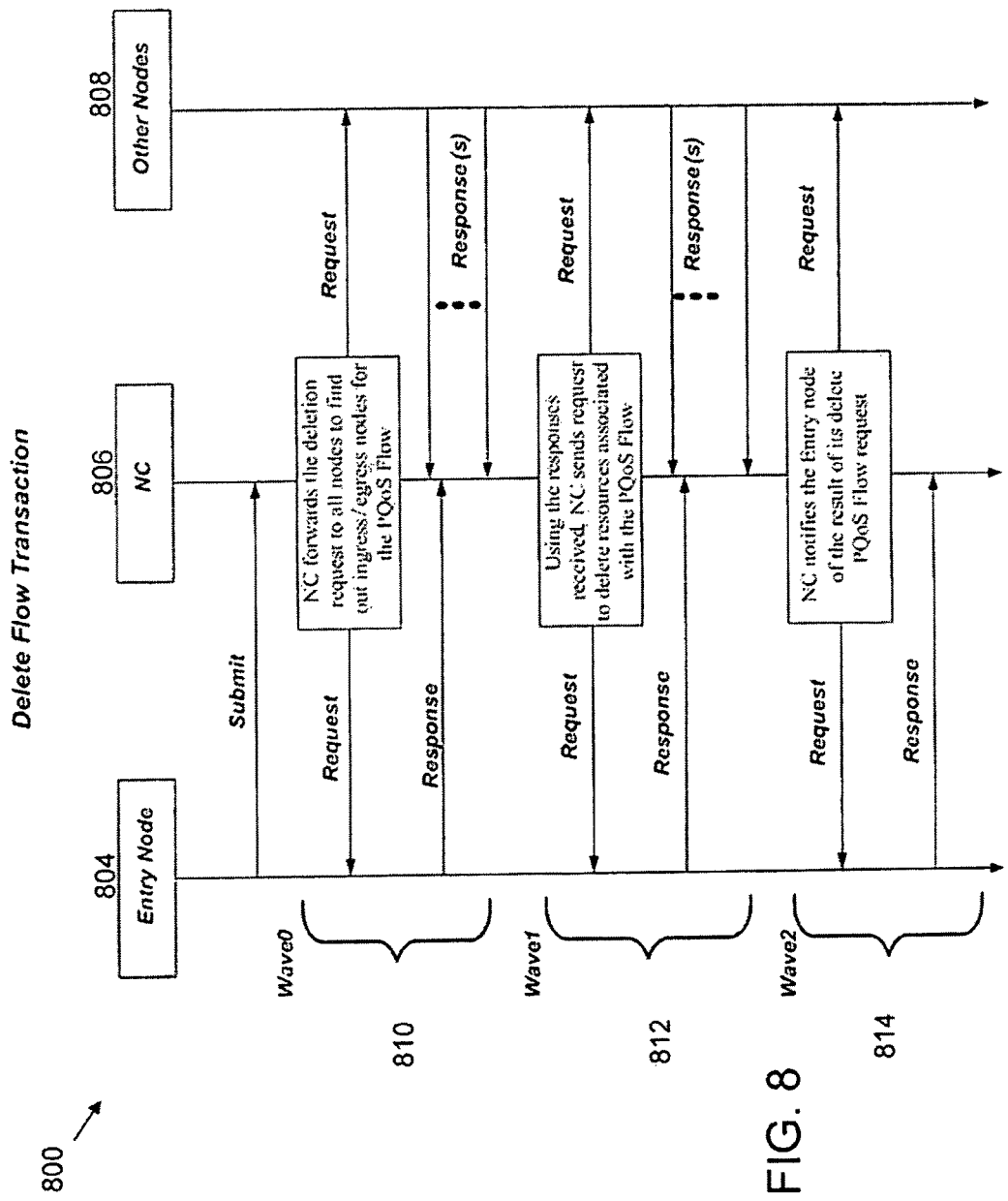
FIG. 8 is a diagram showing a Delete transaction in accordance with the embodiment of FIG. 5.

The purpose of Delete Quality of Service flow transaction is to teardown a specific pQoS flow between a set of ingress 508 and egress 510 nodes (shown in FIG. 5). With reference to FIG. 8, one example of a Delete pQoS transaction 800 in accordance with the embodiment shown in FIG. 5 is now described. The Delete pQoS flow transaction 800 comprises three L2ME Waves 810, 812, 814. The transaction starts when EN 804 sends a Submit message to the NC node 806 specifying the flow ID to be deleted. One example of a Delete message format is shown below in Table 16.

TABLE 16

Submit L2ME Message Format for Delete Transaction

| Field | Length | Usage |
|---|---|---|
| L2ME SUBMIT Header for DELETE | | |
| HDR_FMT | 8 bits | |
| ENTRY_NODE_ID | 8 bits | The ID of the Entry node initiating this transaction |
| ENTRY_INDEX | 8 bits | |
| RESERVED | 8 bits | 0; Type III |
| VENDOR_ID | 16 bits | 0 |
| TRANS_TYPE | 8 bits | 1 = QOS |
| TRANS_SUBTYPE | 8 bits | 3: Delete |
| WAVE_NODEMASK | 32 bits | All QoS Capable Nodes |
| MSG_PRIORITY | 8 bits | 240 |
| TXN_LAST_WAVE_NUM | 8 bits | 2 |
| RESERVED | 8 bits | 0x0; Type III |
| Submit Payload for Delete | | |
| FLOW_ID | 48 bits | QoS flow L2 identification number |
| RESERVED | 16 bits | 0x0; Type III |
| RESERVED | 32 bits | 0x0; Type III |

The first wave (Wave 0) 810 of the Delete transaction 800 informs all network nodes 804, 808 about which pQoS flow and resources are to be deleted. NC node 806 initiates the first wave 810 using a Request message format based on the Submit message to all the nodes 804, 808. The nodes 804, 808 may respond with a Response message, indicating if they have the resources associated with the flow to be deleted.

TABLE 17

Response L2ME Header and Payload for Delete (Wave 0)

| Field | Length | Usage |
|---|---|---|
| Response L2ME Header for Delete (Wave 0) | | |
| HDR_FMT | 8 bits | |
| RESP_STATUS | 8 bits | Bits 7:4 - reserved Type III |
| | | Bit 3: DO_ENTRY_CANCEL - |
| | | Bit 2: IN_NEXT_WAVE - set to '1' if the node has resources to be deleted for the requested flow |
| | | Bit 1: 0 |
| | | Bit 0: INTERPRETED - '1' |
| RESERVED | 8 bits | Type III |
| WAVE_SEQ_N | 8 bits | Copied from initiating REQUEST |
| RESERVED | 32 bits | Type III |
| Response L2ME Payload for Delete (Wave 0) | | |
| RESERVED | 32 bits | 0x0; Type III |

During the second wave 812, Wave 1, the flow resources are deleted. NC node 806 initiates the second wave 812 using an Request message format with the concatenated responses from the first wave 810. A Response message format used in the second wave 812, Wave 1, is shown in Table 18 below as one example of a Response message format. Each node 804, 808 responds with a Response Frame in the second wave 812, indicating flow deletion by setting bit 31 in the DELETED field in the payload portion of the Frame.

TABLE 18

Response L2ME Payload for Delete (Wave 1)

| Field | Length | Usage |
|---|---|---|
| Response L2ME Header for Delete (Wave 1) | | |
| HDR_FMT | 8 bits | |
| RESP_STATUS | 8 bits | Bits 7:4 - reserved Type III |
| | | Bit 3: DO_ENTRY_CANCEL - '0' |
| | | Bit 2: IN_NEXT_WAVE - |
| | | Bit 1: 0 |
| | | Bit 0: INTERPRETED - '1' |
| RESERVED | 8 bits | Type III as defined in ref. [1] |
| WAVE_SEQ_N | 8 bits | Copied from initiating REQUEST |
| RESERVED | 32 bits | Type III as defined in ref. [1] |
| Response L2ME Payload Delete (Wave 1) | | |
| DELETED | 32 bit | Bit 31 - 1 if resources were deleted for the specified flow |
| | | Bits 30:0 - reserved Type III |

In the third wave 814, Wave 2, NC node 806 informs EN 804 that the requested flow was deleted. The third wave 814 is initiated by NC node 806 using a Request message format with the concatenated responses from the second wave 812. The Delete transaction 800 is completed when EN 804 and any other requested nodes 808 provide their final Response as shown in Table 19 below.

TABLE 19

Response L2ME Header and Payload Format (Wave 2)

| Field | Length | Usage |
|---|---|---|
| Response L2ME Header for Delete (Wave 2) | | |
| HDR_FMT | 8 bits | |
| RESP_STATUS | 8 bits | Ignored by receiving node |

TABLE 19-continued

Response L2ME Header and Payload Format (Wave 2)

| Field | Length | Usage |
|---|---|---|
| RESERVED | 8 bits | Type III |
| WAVE_SEQ_N | 8 bits | Copied from initiating REQUEST |
| RESERVED | 32 bits | Type III |
| Response L2ME Payload for Delete (Wave 2) | | |
| RESERVED | 32 bit | Type III |

List Parameterized Quality of Service Flow Transaction

Figure 9:
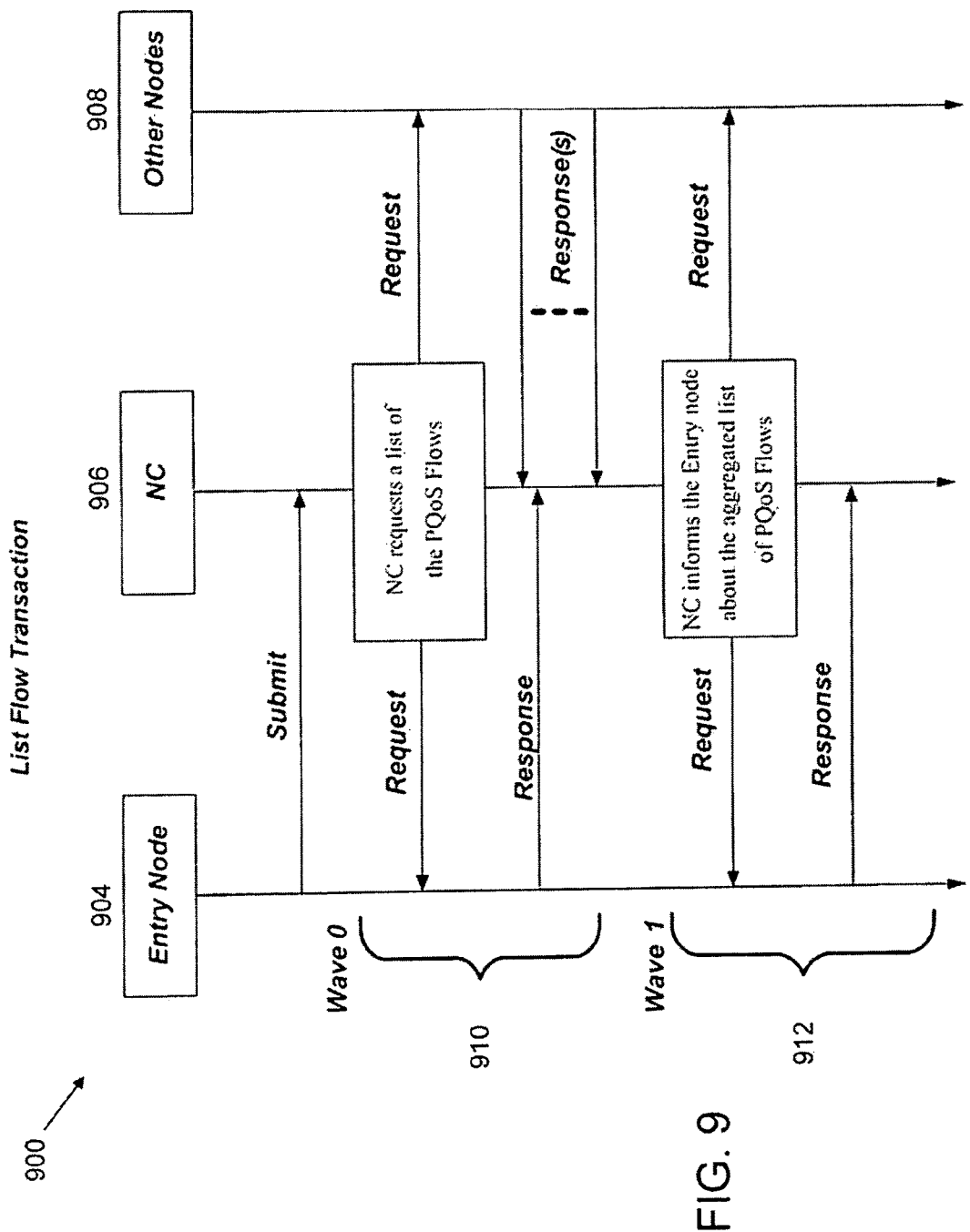
FIG. 9 is a diagram showing a List transaction in accordance with the embodiment of FIG. 5.

The List pQoS flow transaction enables any network node to retrieve the list of flows in the network. With reference to FIG. 9, one example of a List pQoS transaction 900 in accordance with the embodiment shown in FIG. 5 is now described. This transaction typically comprises two L2ME Waves 910, 912 and is initiated when EN 904 sends a Submit message to the NC node 906 with a format in accordance with Table 20 below. Each node 904, 906, 908 is configured to maintain a logical table of its ingress flows numbered contiguously from 0. The ordering of elements in this table only changes when a flow is created or deleted. Thus, a remote node may build up a complete list of flows by selecting which entry in the logical table is first.

TABLE 20

Submit L2ME Frame Format for List

| Field | Length | Usage |
|---|---|---|
| Submit L2ME Header Payload for LIST | | |
| HDR_FMT | 8 bits | |
| ENTRY_NODE_ID | 8 bits | |
| ENTRY_INDEX | 8 bits | |
| RESERVED | | |
| VENDOR_ID | 16 bits | 0 |
| TRANS_TYPE | 8 bits | 1 = PQOS |
| TRANS_SUBTYPE | 8 bits | 4: LIST_FLOWS |
| WAVE_NODEMASK | 32 bits | Set of nodes to query |
| MSG_PRIORITY | 8 bits | 128 |
| TXN_LAST_WAVE_NUM | 8 bits | 1 |
| RESERVED | 8 bits | 0x0; Type III |
| Submit L2ME Payload for List | | |
| FLOW_START_INDEX | 32 bits | Starting index in the logical table of the first flow to be returned |
| FLOW_MAX_RETURN | 8 bits | Maximum number of flows to be returned |
| RESERVED | 24 bits | 0x0; Type III |

In the first wave 910, Wave 0, the NC node 906 informs the nodes 904, 908 which range of QoS flows are queried. NC node 906 initiates the first wave 910 using a Request message format based on the Submit message received from EN 804. The Request message is sent to the node 908 that may provide a Response. The queried node 908 may respond with a Response message format according to Table 21 below. The RETURN_FLOW_ID field in the payload portion of LIST_RESPONSE Frame contains the list of pQoS flows, starting with the node's FLOW_START_INDEX and with up to the maximum number of flows as specified by FLOW_MAX_RETURN. Note that the flow update counter is incremented when the number of flows is changed. For the purposes of this transaction, it is assumed that a node keeps a logical table of ingress flows where each element is assigned an index from 0 to the maximum number of flows to be deleted.

TABLE 21

Response L2ME Frame Payload Format (Wave 0)

| Field | Length | Usage |
|---|---|---|
| Response L2ME Header for List Transaction | | |
| HDR_FMT | 8 bits | |
| RESP_STATUS | 8 bits | Bits 7:4 - reserved Type III as Bit 3: DO_ENTRY_CANCEL - Bit 2: IN_NEXT_WAVE - Bit 1: reserved Type III Bit 0: INTERPRETED - '1' |
| RESERVED | 8 bits | Type III |
| WAVE_SEQ_N | 8 bits | Copied from initiating REQUEST |
| RESERVED | 32 bits | Type III |
| Response L2ME Payload for List Transaction | | |
| RESERVED | 24 bits | 0; Type III |
| FLOW UPDATE COUNT | 8 bits | The value of a counter that increments on the queried node whenever the logical table of flow IDs on that node changes |
| TOTAL FLOW ID COUNT | 32 bits | Total number of ingress flows at this node |
| Returned Flow IDs (up to 32 flow IDs) | | |
| For (i=0; i<N; i++) { | | N = number of returned flow IDs |
| RETURNED FLOW ID | 48 bits | Returned flow ID |
| RESERVED | 16 bits | Type III |
| } | | |

In the second wave 912, Wave 1, the NC node 906 informs the EN 904 and any other interested nodes 908 about the aggregated list of pQoS flows found in the first wave 910. The NC node 906 initiates the second wave 912 using a Request message format with the concatenated responses from the first wave 910. The List transaction 900 is completed when all the interested nodes 904, 908 send their final Responses to NC node 906 as shown in Table 22 below.

TABLE 22

Request L2ME Message Format for List (Wave 1)

| Field | Length | Usage |
|---|---|---|
| Response L2ME Header for List (Wave 1) | | |
| HDR_FMT | 8 bits | |
| RESP_STATUS | 8 bits | Ignored by the receiving node |
| RESERVED | 8 bits | Type III |
| WAVE_SEQ_N | 8 bits | Copied from initiating REQUEST |
| RESERVED | 32 bits | Type III |
| Response L2ME Payload for LIST | | |
| RESERVED | 32 bits | 0; Type III |

Query Parameterized Quality of Service Flow Transaction

Figure 10:
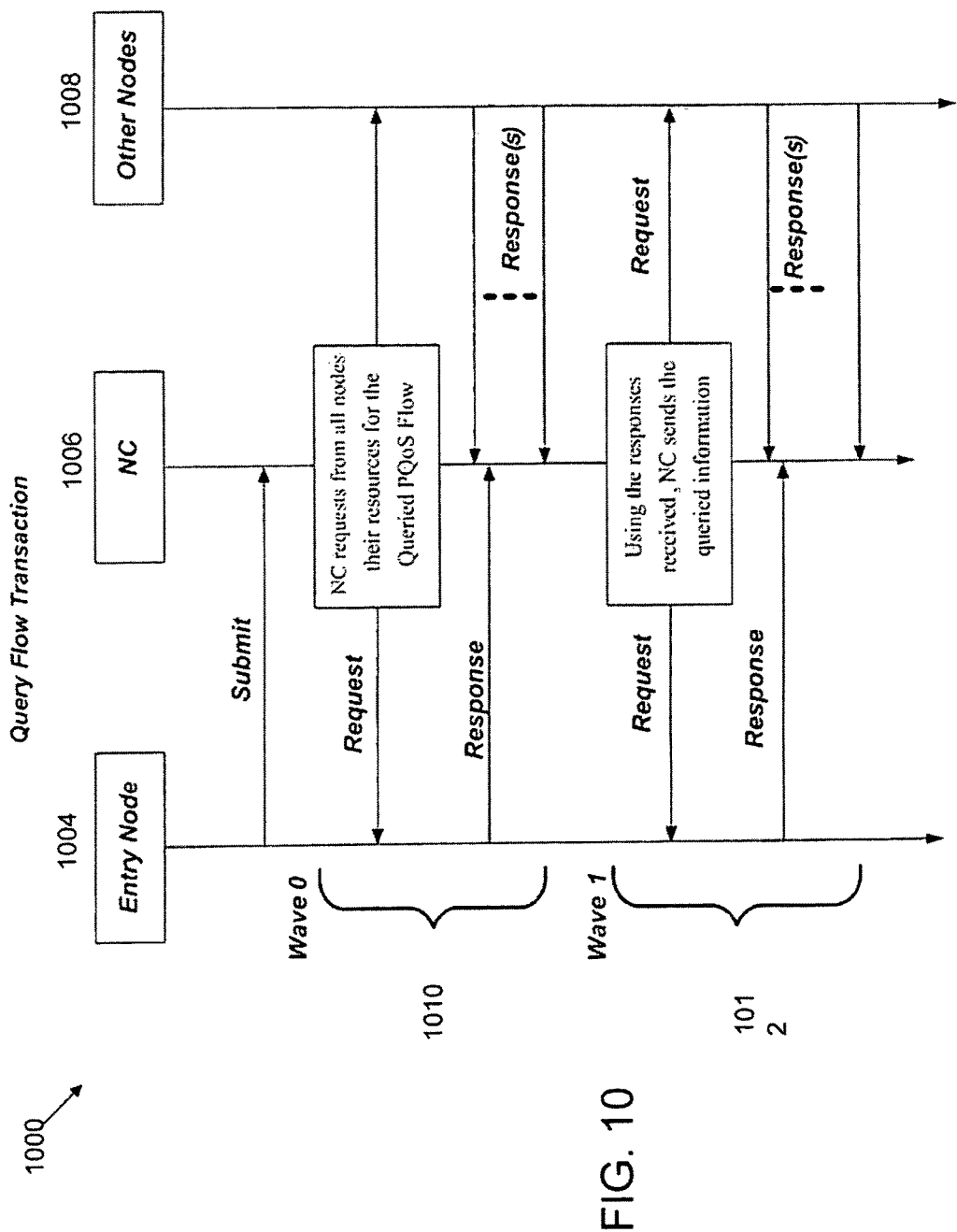
FIG. 10 is a diagram showing a Query transaction in accordance with the embodiment of FIG. 5.

The purpose of the Query pQoS flow transaction is to retrieve the attributes of a specific flow ID. With reference to FIG. 10, one example of a Query pQoS transaction 1000 in accordance with the embodiment shown in FIG. 5 is now described. The Query pQoS transaction 1000 comprises two Wave Cycles 1010, 1012 and starts when EN 1004 sends a Submit message to the NC node 1006 specifying the flow ID of a particular pQoS flow.

TABLE 23

Submit L2ME Frame Format for Query

| Field | Length | Usage |
|---|---|---|
| Submit L2ME Header for Query | | |
| HDR_FMT | 8 bits | |
| ENTRY_NODE_ID | 8 bits | The ID of the node sending this message. |
| ENTRY_INDEX | 8 bits | |
| RESERVED | 8 bits | 0; Type III |
| VENDOR_ID | 8 bits | 0 |
| TRANS_TYPE | 8 bits | 1 = PQOS |
| TRANS_SUBTYPE | 8 bits | 5: Query |
| WAVE_NODEMASK | 32 bits | Set of queried nodes |
| MSG_PRIORITY | 8 bits | 128 |
| TXN_LAST_WAVE_NUM | 8 bits | 2 |
| RESERVED | 8 bits | 0x0; Type III |
| L2ME Payload for Query | | |
| RESERVED | 32 bits | 0x0; Type III |
| FLOW ID | 48 bits | pQoS flow L2 identification number |
| RESERVED | 16 bits | 0x0; Type III as |

The first wave 1010, Wave 0, of the Query transaction 1000 informs the nodes 1004, 1008 which pQoS flow is being queried and initiates when NC node 1006 transmits a Request message based on the Submit message to the nodes 1004, 1008 to identify which of the nodes holds the specific flow. Every node 1004, 1008 may respond with a Response message whether it is the ingress node for the flow or not.

A Response L2ME message format is shown in Table 23 below as one example of such a format. If the node is not the ingress for the flow, it responds with a Response Frame with a zero-length payload.

TABLE 23

Response L2ME Payload for Query (Wave 0) if Flow is Found

| Field | Length | Usage |
|---|---|---|
| Response L2ME Header for Query | | |
| HDR_FMT | 8 bits | |
| RESP_STATUS | 8 bits | Bits 7:4 - reserved Type III |
| | | Bit 3: DO_ENTRY_CANCEL - |
| | | Bit 2: IN_NEXT_WAVE - |
| | | Bit 1: reserved Type III |
| | | Bit 0: INTERPRETED - '1' |
| RESERVED | 8 bits | Type III |
| WAVE_SEQ_N | 8 bits | Copied from initiating REQUEST |
| RESERVED | 32 bits | Type III |
| Response L2ME Payload for Query | | |
| LEASE_TIME_LEFT | 32 bits | Remaining flow lease time; 0x8F if no lease expiration time |
| FLOW_ID | 48 bits | pQoS flow L2 identification number |
| RESERVED | 16 bits | 0x0; Type III |
| RESERVED | 24 bits | 0x0; Type III |
| INGRESS_NODE_ID | 8 bits | Node ID for the ingress of the flow |
| RESERVED | 24 bits | 0x0; Type III |
| EGRESS_NODE_ID | 8 bits | Node ID for egress of unicast flow or 0x3f is for a broadcast flow; otherwise ignore |
| L2ME_DATA | 32 bits | Application specific defined content |
| TV Entries (up to 24 entries) | | |
| For (i=0; i<N; i++) { | | N = number of returned TV ENTRIES |
| TAG NAME | 8 bits | |
| TAG VALUE | 24 bits | Value associated with tag |
| } | | |

In the second wave 1012, Wave 1, the Query results are transmitted to EN 1004 and any other node 1008 interested in the results. NC node 1006 initiates the second wave using a Request L2ME message format with the concatenated Responses from the first wave 1010. The Query transaction 1000 is completed when the interested nodes 1004, 1008 send their final Response Frame as shown in Table 24 below to NC node 1006.

TABLE 24

Response L2ME Message Format for Query (Wave 1)

| Field | Length | Usage |
|---|---|---|
| Response L2ME Header for Query | | |
| HDR_FMT | 8 bits | |
| RESP_STATUS | 8 bits | Ignored |
| RESERVED | 8 bits | Type III |
| WAVE_SEQ_N | 8 bits | Copied from initiating Request |
| RESERVED | 32 bits | Type III |
| Response L2ME Payload for Query | | |
| RESERVED | 32 bits | Type III |

Maintenance Parameterized Quality of Service Flow Transaction

Figure 11:
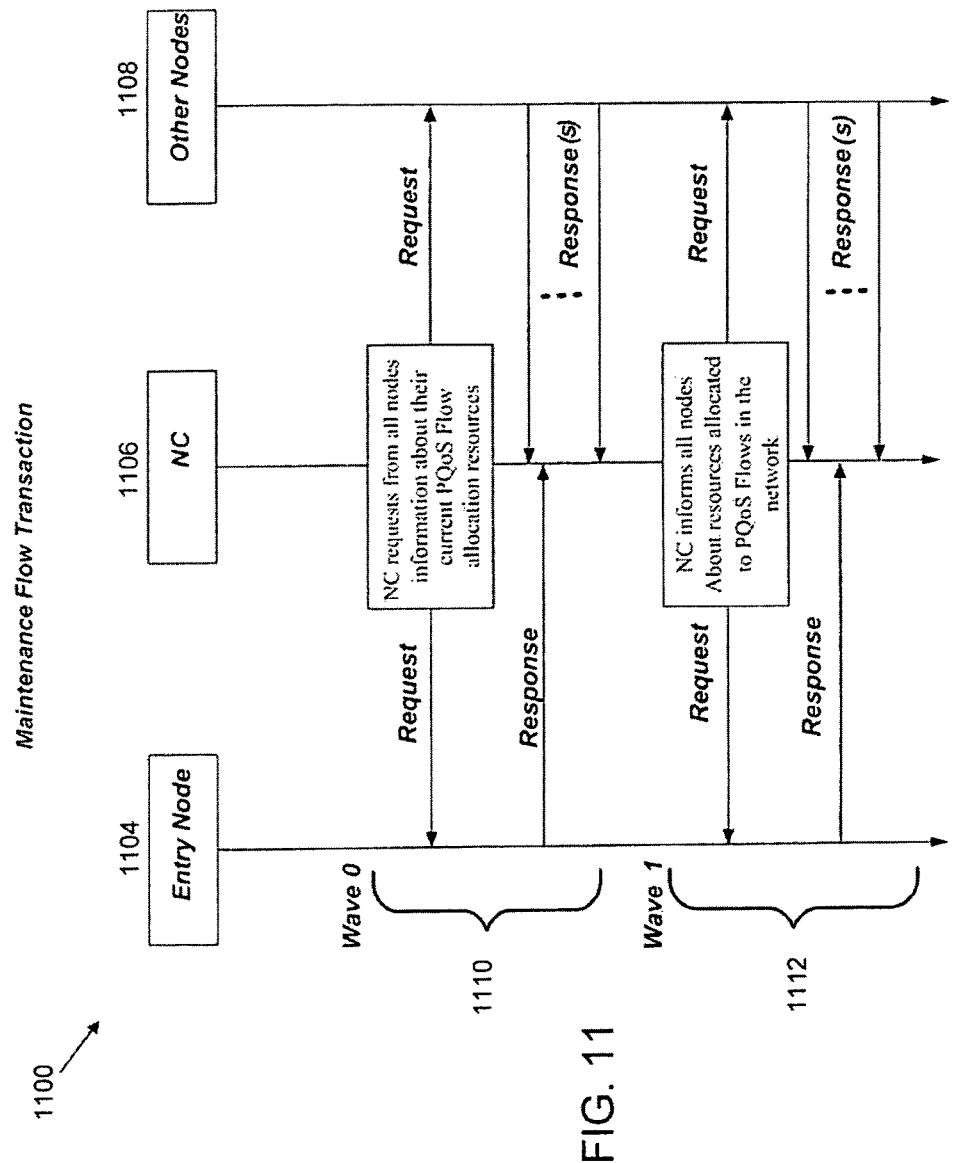
FIG. 11 is a diagram showing a Maintenance transaction in accordance with the embodiment of FIG. 5.

The Maintenance pQoS transaction may be used to periodically assess if there are sufficient network resources for the committed pQoS flows. With reference to FIG. 11, one example of a Maintenance pQoS transaction 1100 in accordance with the embodiment shown in FIG. 5 is now described. Maintenance pQoS transaction 1100 may be accomplished by the NC node 1106 issuing this transaction between T22 (T6/5) to T6 seconds where T6 may be 25 or 50 seconds. Additionally, the NC node 106 may issue this transaction T22 (T6/5) seconds after a new L2ME pQoS-enabled node joins the network 502. The Maintenance transaction 1100 comprises two L2ME Waves 1110, 1112 and a Submit message is not required since the transaction is triggered by the NC node 1106.

NC node 1006 initiates the first wave 1110, Wave 0, and the Maintenance transaction 1100 by transmitting a Request message, one example of which is shown in Table 25 below. The Request message asks all the nodes 1104, 1108 to provide information about their current flow allocation metrics.

TABLE 25

Request L2ME Frame Format for Maintenance (Wave 0)

| Field | Length | Usage |
|---|---|---|
| Request L2ME Header for Maintenance | | |
| HDR_FMT | 8 bits | |
| ENTRY_NODE_ID | 8 bits | 0xFF |
| ENTRY_INDEX | 8 bits | |
| RESERVED | 8 bits | 0; Type III |
| VENDOR_ID | 8 bits | 0 |
| TRANS_TYPE | 8 bits | 1 = PQOS |
| TRANS_SUBTYPE | 8 bits | 6: Maintenance |
| WAVE_NODEMASK | 32 bits | All nodes |
| CYCLE_NODEMASK | 32 bits | |
| WAVE_STATUS | 8 bits | 0x0 |
| DIR_LEN | 8 bits | Ignore |
| TXN_SEQ_N | 8 bits | |
| TXN_WAVE_N | 8 bits | 0 |
| L2ME Payload for Maintenance | | |
| RESERVED | 32 bits | 0x0; Type III |

Each requested node 1104, 108 sends its Response message with the payload format as shown in Table 26 for the first wave 1110, specifying the EXISTING_TPS and EXISTING_PPS values for all the existing flows in which the node is an ingress node.

TABLE 26

Response L2ME Payload Format for Maintenance (Wave 0)

| Field | Length | Usage |
|---|---|---|
| Response L2ME Header for Maintenance | | |
| HDR_FMT | 8 bits | |
| RESP_STATUS | 8 bits | Bits 7:4 - reserved Type III<br>Bit 3: DO_ENTRY_CANCEL - '0'<br>Bit 2: IN_NEXT_WAVE -<br>Bit 1: 0<br>Bit 0: INTERPRETED - '1' |
| RESERVED | 8 bits | Type III |
| WAVE_SEQ_N | 8 bits | Copied from initiating Request |
| RESERVED | 32 bits | Type III |
| Request L2ME Payload for Maintenance | | |
| EXISTING_TPS | 32 bits | SLOT_TIME/second of all the existing flows for which the node is ingress node |
| EXISTING_PPS | 32 bits | packets/second of all the existing flows for which the node is ingress node |

TABLE 26-continued

Response L2ME Payload Format for Maintenance (Wave 0)

| Field | Length | Usage |
|---|---|---|
| RESERVED | 32 bits | 0x0; Type III |
| RESERVED | 32 bits | 0x0: Type III |

The second wave 1112, Wave 1, enables NC node 1106 to find out if the current pQoS flows in the network are guaranteed in view of changing network conditions based on the results of the first wave 1110. The NC node 1106 initiates the second wave 1112 using a Request message format header shown in Table 27 with the following changes:
1. WAVE_STATUS=1
2. DIR_LEN=0x10
3. TXN_WAVE_N=1

If the aggregate of all the pQoS flows are over-committed, then NC node 1106 sets the OVER_COMMITTED field value to "1" in the Request message of the second wave 1012. Each node 1104, 1108 may send a message to its application layer notifying it that the network's pQoS flow resources are not guaranteed.

TABLE 27

Request L2ME Payload Message Format for Maintenance (Wave 1)

| Field | Length | Description |
|---|---|---|
| OVER_COMMITTED | 32 bits | Set to '1' if pQoS flows are over committed; otherwise '0' |
| RESERVED | 32 bits | 0x0; Type III |
| RESERVED | 32 bits | 0x0; Type III |

The Maintenance transaction 1100 is completed when each node 1104, 1108 sends its Response Frame to NC node 1106 as shown in Table 28 below.

TABLE 28

Response L2ME Message Format for Maintenance (Wave 1)

| Field | Length | Usage |
|---|---|---|
| Response L2ME Header for Maintenance (Wave 1) | | |
| HDR_FMT | 8 bits | |
| RESP_STATUS | 8 bits | Ignored by receiving node |
| RESERVED | 8 bits | Type III |
| WAVE_SEQ_N | 8 bits | Copied from initiating REQUEST |
| RESERVED | 32 bits | Type III |
| Response L2ME Payload for Maintenance | | |
| RESERVED | 32 bits | 0x0: Type III |

In addition to the above described embodiments, the disclosed method and apparatus may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the disclosed method and system have been described in terms of embodiments that serve as example, it is not limited thereto. Rather, the appended claims should be construed broadly, to include other variants and embodiments of the disclosed method and system, which may be made by those skilled in the art without departing from the scope and range of equivalents of the method and system.

What is claimed is:

1. A communication method implemented in a Network Coordinator (NC) node of a communication network of a premises, the method comprising:
broadcasting to a plurality of nodes of the network, a request for a guaranteed quality of service flow in the network from a source node to at least one egress node, the plurality of nodes of the network to which the NC node broadcasts the request including at least the source node and the at least one egress node;
receiving a first response to the request from the source node, wherein the source node is the point of origin for the purposes of the guaranteed quality of service flow for data to be communicated within the guaranteed quality of service flow, the first response indicating whether the source node has available resources to support the guaranteed quality of service flow;
receiving a second response to the request from the at least one egress node indicating whether the at least one egress node has available resources to support the guaranteed quality of service flow; and
if the source node and the at least one egress node have available resources to support the guaranteed quality of service flow, then allocating resources for the guaranteed quality of service flow;
if the source node and the at least one egress node do not have available resources to support the guaranteed quality of service flow, then:
denying the guaranteed quality of service flow; and
if the guaranteed quality of service flow is denied based on bandwidth-related reasons, then determining a maximum data rate that would have resulted in a successful request for a guaranteed quality of service flow, and transmitting a message comprising information describing the maximum data rate that would have resulted in a successful request for a guaranteed quality of service flow.

2. The communication method of claim 1, further comprising receiving from an entry node of the network a Submit message, wherein the request is broadcast from the Network Coordinator node as a consequence of the received Submit message,
wherein the Submit message comprises information identifying the source node, and information identifying a data rate and packet size of the requested guaranteed quality of service flow.

3. The communication method of claim 1, wherein the network of a premises is a network of a home.

4. The communication method of claim 3, wherein the network of a home is a coaxial cable-based network, in which the NC node schedules all traffic for all other nodes of the network.

5. The communication method of claim 1, wherein the first response comprises information indicating the source node's cost associated with admitting the flow, and the second response does not comprise information indicating the at least one egress node's cost associated with admitting the flow.

6. The communication method of claim 1, wherein:
the received first response comprises first information indicating a peak data rate that the source node can commit to the requested guaranteed quality of service flow; and
the method comprises determining whether there are sufficient resources to admit the flow based, at least in part, on the first information.

7. The communication method of claim 6, wherein:
the received first response comprises second information indicating the source node's cost of supporting the requested guaranteed quality of service flow; and
the method comprises determining whether there are sufficient resources to admit the flow based, at least in part, on the second information.

8. The communication method of claim 7, wherein:
the received second response comprises third information indicating a peak data rate that the egress node can commit to the requested guaranteed quality of service flow;
the received second response comprises fourth information indicating the egress node's cost of supporting the requested guaranteed quality of service flow; and
the method comprises determining whether there are sufficient resources to admit the flow based, at least in part, on the third and fourth information.

9. The communication method of claim, 8, wherein the second response comprises an information field for a code indicating why the egress node is unable to fulfill the request for the guaranteed quality of service flow.

10. The communication method of claim 1, comprising if the source node and the at least one egress node have available resources to support the guaranteed quality of service flow, then transmitting at least one request message indicating that the requested guaranteed quality of service flow is admitted.

11. The communication method of claim 10, wherein the message, comprising information describing the maximum data rate that would have resulted in a successful request for a guaranteed quality of service flow, additionally comprises a code indicating that the request for the guaranteed quality of service flow was denied based on bandwidth-related reasons.

12. The communication method of claim 11, comprising at the source node and the egress node, if the at least one message transmitted by the NC node indicating that the requested guaranteed quality of service flow is admitted is received, then:
allocating resources necessary to support the guaranteed quality of service flow; and
communicating a response message to the NC node indicating that the necessary resources have been allocated.

13. A non-transitory machine readable storage medium encoded with program code, wherein when the program code is executed by one or more processors of a Network Coordinator (NC) node of a communication network of a premises, the NC node performs a communication method comprising:
broadcasting to a plurality of nodes of the network, a request for a guaranteed quality of service flow in the network from a source node to at least one egress node, the plurality of nodes of the network to which the NC node broadcasts the request including at least the source node and the at least one egress node;

receiving a first response to the request from the source node, wherein the source node is the point of origin for the purposes of the guaranteed quality of service flow for data to be communicated within the guaranteed quality of service flow, the first response indicating whether the source node has available resources to support the guaranteed quality of service flow directly to the at least one egress node;

receiving a second response to the request from the at least one egress node indicating whether the at least one egress node has available resources to support the guaranteed quality of service flow; and if the source node and the one or more egress node have available resources to support the guaranteed quality of service flow, then allocating resources for the guaranteed quality of service flow if the source node and the one or more egress nodes do not have available resources to support the guaranteed quality of service flow, then:

denying the guaranteed quality of service flow; and if the guaranteed quality of service flow is denied based on bandwidth-related reasons, then determining a maximum data rate that would have resulted in a successful request for a guaranteed quality of service flow, and transmitting a message comprising information describing the maximum data rate that would have resulted in a successful request for a guaranteed quality of service flow.

14. The non-transitory machine readable storage medium of claim 13, the method further comprising receiving from an entry node of the network a Submit message, wherein the request is broadcast from the Network Coordinator node as a consequence of the received Submit message, wherein the Submit message comprises information identifying the source node, and information identifying a data rate and packet size of the requested guaranteed quality of service flow.

15. The non-transitory machine readable storage medium of claim 13, wherein the network of a premises is a network of a home.

16. The non-transitory machine readable storage medium of claim 13, wherein:

the received first response comprises first information indicating a peak data rate that the source node can commit to the requested guaranteed quality of service flow; and the method comprises determining whether there are sufficient resources to admit the flow based, at least in part, on the first information.

17. The non-transitory machine readable storage medium of claim 16, wherein:

the received first response comprises second information indicating the source node's cost of supporting the requested guaranteed quality of service flow; and the method comprises determining whether there are sufficient resources to admit the flow based, at least in part, on the second information.

18. The non-transitory machine readable storage medium of claim 13, wherein the first response comprises information indicating the source node's cost associated with admitting the flow, and the second response does not comprise information indicating the at least one egress node's cost associated with admitting the flow.

19. The non-transitory machine readable storage medium of claim 13, wherein the method comprises, if the source node and the at least one egress node have available resources to support the guaranteed quality of service flow, then transmitting at least one request message indicating that the requested guaranteed quality of service flow is admitted.

20. The non-transitory machine readable storage medium of claim 19, wherein the message, comprising information describing the maximum data rate that would have resulted in a successful request for a guaranteed quality of service flow, additionally comprises a code indicating that the request for the guaranteed quality of service flow was denied based on bandwidth-related reasons.

21. The non-transitory machine readable storage medium of claim 20, the method comprising at the source node and the egress node, if the at least one message transmitted by the NC node indicating that the requested guaranteed quality of service flow is admitted is received, then:

allocating resources necessary to support the guaranteed quality of service flow; and communicating a response message to the NC node indicating that the necessary resources have been allocated.

22. The non-transitory machine readable storage medium of claim 13, wherein the network of a premises is a coaxial cable-based network of a home, in which the NC node schedules all traffic for all other nodes of the network.

23. A system comprising:

a Network Coordinator (NC) node of a communication network of a premises, the Network Coordinator operative to broadcast to a plurality of nodes of the network a request for a guaranteed quality of service flow in the network;

a source node of the network, wherein the source node is the point of origin for the purposes of the guaranteed quality of service flow for data to be communicated within the guaranteed quality of service flow, the source node operative to transmit a first response to the NC node, the first response indicating whether the source node has available resources to support the guaranteed quality of service flow;

at least one egress node of the network, the at least one egress node operative to transmit a second response to the Network Coordinator, the second response indicating whether the at least one egress node has available resources to support the guaranteed quality of service flow from the source node;

wherein the Network Coordinator is further operative to:

if the source node and the one or more egress nodes do not have available resources to support the guaranteed quality of service flow, then at the NC node, deny the guaranteed quality of service flow; and if the guaranteed quality of service flow is denied based on bandwidth-related reasons, then at the NC node, determine a maximum data rate that would have resulted in a successful request for a guaranteed quality of service flow, and transmit a message comprising information describing the maximum data rate that would have resulted in a successful request for a guaranteed quality of service flow; and allocate resources for the guaranteed quality of service flow if the source node has available resources to transmit, and the at least one egress node has available resources to receive, the quality of service flow.

24. The system of claim 23, wherein the Network Coordinator is further configured to broadcast the request as a consequence of receiving a Submit message from an entry node of the network,
    wherein the Submit message comprises information identifying the source node, and information identifying a data rate and packet size of the requested guaranteed quality of service flow.

\* \* \* \* \*